(12) United States Patent
Lin et al.

(10) Patent No.: US 11,604,866 B2
(45) Date of Patent: Mar. 14, 2023

(54) EMOTION-BASED AUTHENTICATION SERVICE

(71) Applicant: AT&T Intellectual Property I, L.P., Atlanta, GA (US)

(72) Inventors: Olivia Lin, Plano, TX (US); Daryl Wilkerson, Rockwall, TX (US); Ashley Isles, Dallas, TX (US); Jeff Beavers, Frisco, TX (US); Toni Rouser, Grand Prairie, TX (US); Tyler Smith, Richardson, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/189,936

(22) Filed: Mar. 2, 2021

(65) Prior Publication Data

US 2022/0284086 A1    Sep. 8, 2022

(51) Int. Cl.
*G06F 21/00*    (2013.01)
*G06F 21/44*    (2013.01)
*G06F 21/32*    (2013.01)

(52) U.S. Cl.
CPC .............. *G06F 21/44* (2013.01); *G06F 21/32* (2013.01); *G06F 2221/2103* (2013.01)

(58) Field of Classification Search
CPC ... G06F 21/32; G06F 21/44; G06F 2221/2103
See application file for complete search history.

(56) References Cited

U.S. PATENT DOCUMENTS

| | | | |
|---|---|---|---|
| 9,053,513 B2 | 6/2015 | Meredith et al. | |
| 9,858,575 B2 | 1/2018 | Meredith et al. | |
| 11,138,305 B1* | 10/2021 | Hughes | ................ G06V 40/197 |
| 2015/0281152 A1* | 10/2015 | Dijoux | .................... H04L 51/10 |
| | | | 709/206 |
| 2019/0392659 A1* | 12/2019 | Seenivasagam | ..... G06V 40/168 |
| 2020/0293765 A1* | 9/2020 | Bryant, III | ............ G06F 3/0482 |
| 2020/0403947 A1* | 12/2020 | Fogu | ...................... G06Q 50/01 |

OTHER PUBLICATIONS

"Emotion Wheel," retrieved at https://d207ibygpg2zlx.cloudfront.net/image/upload/v1586561082/articles_upload/content/ejuktec3mb8wv51i9nlm.png on Jan. 8, 2021.

* cited by examiner

*Primary Examiner* — Philip J Chea
*Assistant Examiner* — Rodman Alexander Mahmoudi
(74) *Attorney, Agent, or Firm* — Hartman & Citrin LLC

(57) ABSTRACT

An emotion-based authentication service can obtain data associated with a user device, identify an emotion associated with the data, detect an authentication request that requests authentication of the user device using an emotion-based authentication service, generate, based on the emotion and the data, a challenge for the user device and an expected response to the challenge, receive, from the user device, a response to the challenge, and determine if the user device is to be authenticated based on the response to the challenge and the expected response to the challenge.

20 Claims, 20 Drawing Sheets

EMOTION-BASED AUTHENTICATION SERVICE

BACKGROUND

As more and more commerce and other private aspects of consumers' lives move to the Internet, a proliferation in the various types of web applications, services, and/or resources that require authentication has correspondingly increased. These and other applications, services, and/or resources may ask customers to enter sensitive personal information such as birthdates, social security numbers, or other private information to authenticate their identity, potentially exposing these and other types of private information to interception on the Internet or elsewhere.

Similarly, with the ever-increasing number of sites and/or applications that require authentication, users may forget passwords or other information needed to access certain of these sites and/or applications. To combat these and/or other shortfalls of current authentication technologies, various technologies for knowledge-based authentication have been developed, where a user may be queried for something they know (e.g., "who was your first grade teacher?").

These and other knowledge-based authentication techniques, however, can be easily circumvented in some cases where a targeted user is researched by nefarious actors, particularly given the proliferating amount of information about people currently available in various electronic and/or digital formats.

SUMMARY

The present disclosure is directed to an emotion-based authentication service, which can provide a knowledge-based authentication approach that is relatively secure from circumvention compared to previous knowledge-based authentication techniques. A user device can operate in communication with a server computer, for example via a communications network. The user device can execute an emotion-based authentication application that can be configured to obtain data (e.g., images, text, or other data) and information that can identify an emotion or emotional responses to the data from the user device. The emotion-based authentication application also can be configured to capture camera output, in some embodiments, as well as other information such as messages, date and time information, location information, reactions to images or text, combinations thereof, or the like. The emotion-based authentication application can generate user data that includes these and other types of information and provide the user data to the emotion-based authentication service hosted by the server computer.

The emotion-based authentication service can be configured to analyze the user data and, optionally, other data, which can be obtained from data sources such as social networking sites, messaging services, photo sharing applications, and the like. The other data can include photographs, videos, text, or other data and emotions associated with those data as well. The emotion-based authentication service can generate emotion data based on the user data and/or the other data. The emotion data can include one or more records for a particular user or user device, wherein each record can include at least one emotion, at least one piece of data to which the emotion applies (e.g., a photograph, video, or other image; text; a contact name; etc.), and data that identifies a user or user device with which this emotion and piece of data is associated.

The emotion-based authentication service can be configured to perform emotion-based authentication using the emotion data. In particular, the emotion-based authentication service can be configured to generate a challenge and an expected response based on the emotion data. The challenge can include the image or the text, and the expected response can include an identifier of the emotion associated with that image or the text by a user or user device. The emotion-based authentication service can provide the challenge to a user device, and receive a response from the user device. The emotion-based authentication service can determine if the response matches an expected response. If the response matches an expected response, the user device or user can be authenticated, or a transaction can be allowed to proceed. If the response does not match an expected response, the user device or user may not be authenticated, or the transaction may be blocked or not allowed to proceed.

In some embodiments, the emotion-based authentication service can be configured to perform the emotion-based authentication in response to receiving an authentication request (e.g., from a third-party server) or the like. In various embodiments, the third-party server can be in communication with the user device and the server computer, though this is not necessarily the case in all embodiments. The emotion-based authentication service also can be configured to generate an authentication decision, which can inform a requestor or other entity to allow or block transactions (e.g., to allow or block access to a resource hosted by the third-party server, to allow a transaction to complete, etc.) or the like. It should be understood that this example is illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include obtaining data associated with a user device, identifying an emotion associated with the data, detecting an authentication request that requests authentication of the user device using an emotion-based authentication service, generating, based on the emotion and the data, a challenge for the user device and an expected response to the challenge, receiving, from the user device, a response to the challenge, and determining if the user device is to be authenticated based on the response to the challenge and the expected response to the challenge.

In some embodiments, the data and the emotion can be obtained from the user device. In some embodiments, the data can include an image, and generating the challenge can include generating data that, when rendered by the user device, can cause the user device to present the image and to challenge for a selection of one of two or more emotions that can include the emotion. In some embodiments, the computer-executable instructions, when executed by the processor, can cause the processor to perform operations that further can include detecting a transaction associated with the user device; determining that emotion-based authentication is to be used for the transaction; determining an authentication level for the challenge and generating the challenge based on the authentication level; ending the transaction if it is determined that the response to the challenge does not satisfy the challenge; and allowing the transaction if it is determined that the response to the challenge does satisfy the challenge.

According to another aspect of the concepts and technologies disclosed herein, a method is disclosed. The method can include obtaining, at a computer that can include a processor that executes an emotion-based authentication service, data associated with a user device; identifying, by the processor, an emotion associated with the data; detecting, by the processor, an authentication request that requests authentication of the user device using the emotion-based authentication service; generating, by the processor and based on the emotion and the data, a challenge for the user device and an expected response to the challenge; receiving, by the processor and from the user device, a response to the challenge; and determining, by the processor, if the user device is to be authenticated based on the response to the challenge and the expected response to the challenge.

In some embodiments, the data and the emotion can be obtained from the user device. In some embodiments, the method further can include registering the user device with the emotion-based authentication service. Registering the user device can include obtaining an opt-in from the user device for using emotion-based authentication. In some embodiments, identifying the emotion can include receiving, from the user device, data that can define the emotion at two or more levels of specificity. The two or more levels of specificity can include a general category of emotion and a specific emotion that can fall into the general category of emotion.

In some embodiments, the data can include an image, and generating the challenge can include generating data that, when rendered by the user device, can cause the user device to present the image and to challenge for a selection of one of two or more emotions that can include the emotion. In some embodiments, the data can include text, and generating the challenge can include generating data that, when rendered by the user device, can cause the user device to present the text and to challenge for a selection of one of two or more emotions that can include the emotion.

In some embodiments, the data can include a group of images, the emotion can include a group of emotions associated with the group of images, and the challenge can include two or more groups of images that can include the group of images; two or more groups of emotions that can include the group of emotions; and a challenge to indicate, via a user interface, that the group of images matches the group of emotions. In some embodiments, the method can further include detecting a transaction associated with the user device; determining that emotion-based authentication is to be used for the transaction; determining an authentication level for the challenge and generating the challenge based on the authentication level; ending the transaction if it is determined that the response to the challenge does not satisfy the challenge; and allowing the transaction if it is determined that the response to the challenge does satisfy the challenge.

In some embodiments, the data and the emotion can be obtained from data sources that can include a news site, a social networking platform, and a messaging platform. In some embodiments, the data can include an image and camera output obtained from the user device. The camera output can be analyzed to determine a facial expression associated with the emotion. Determining if the user device is to be authenticated can include determining a further facial expression based on a further camera output and determining if the further facial expression matches the facial expression. In some embodiments, the data can include an image, generating the challenge can include generating data that, when rendered by the user device, can cause the user device to present the image in a user interface that can include the image and two or more user interface controls that can include a user interface control that identifies the emotion. In some embodiments, the data can include an image that was included in a message sent from the user device, where the emotion was specified in the message sent from the user device.

According to yet another aspect of the concepts and technologies disclosed herein, a computer storage medium is disclosed. The computer storage medium can store computer-executable instructions that, when executed by a processor, cause the processor to perform operations. The operations can include obtaining data associated with a user device; identifying an emotion associated with the data; detecting an authentication request that requests authentication of the user device using an emotion-based authentication service; generating, based on the emotion and the data, a challenge for the user device and an expected response to the challenge; receiving, from the user device, a response to the challenge; and determining if the user device is to be authenticated based on the response to the challenge and the expected response to the challenge.

In some embodiments, the data and the emotion can be obtained from the user device. In some embodiments, the data can include an image, and generating the challenge can include generating data that, when rendered by the user device, can cause the user device to present the image and to challenge for a selection of one of two or more emotions that can include the emotion. In some embodiments, the computer-executable instructions, when executed by the processor, can cause the processor to perform operations that further can include detecting a transaction associated with the user device; determining that emotion-based authentication is to be used for the transaction; determining an authentication level for the challenge and generating the challenge based on the authentication level; ending the transaction if it is determined that the response to the challenge does not satisfy the challenge; and allowing the transaction if it is determined that the response to the challenge does satisfy the challenge.

Other systems, methods, and/or computer program products according to embodiments will be or become apparent to one with skill in the art upon review of the following drawings and detailed description. It is intended that all such additional systems, methods, and/or computer program products be included within this description, and be within the scope of this disclosure.

DETAILED DESCRIPTION

Figure 1:
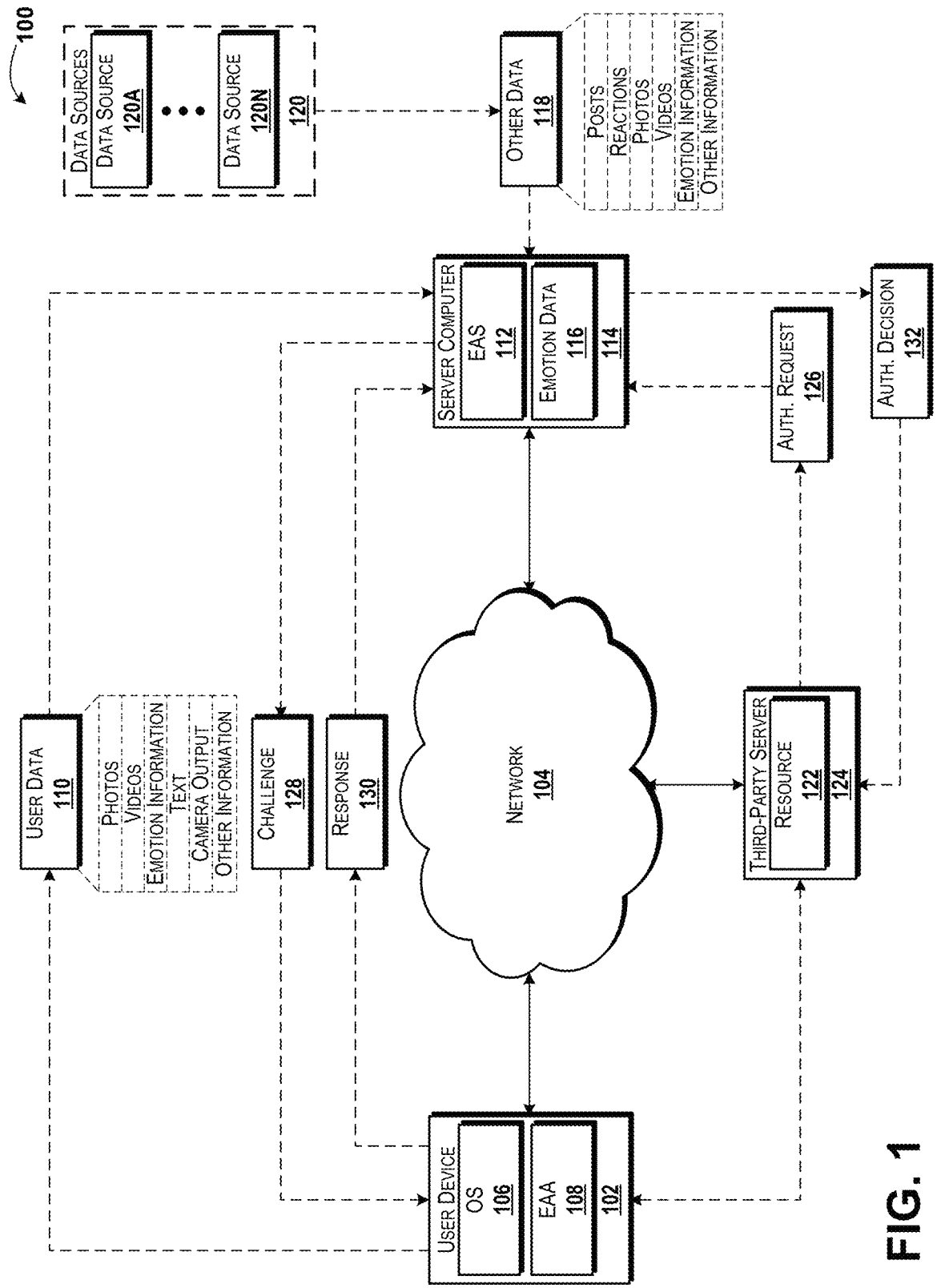
FIG. 1 is a system diagram illustrating an illustrative operating environment for various embodiments of the concepts and technologies described herein.

The following detailed description is directed to an emotion-based authentication service. A user device can operate in communication with a server computer, for example via a communications network. The user device can execute an emotion-based authentication application that can be configured to obtain data (e.g., images, text, or other data) and information that can identify an emotion or emotional responses to the data from the user device. The emotion-based authentication application also can be configured to capture camera output, in some embodiments, as well as other information such as messages, date and time information, location information, reactions to images or text, combinations thereof, or the like. The emotion-based authentication application can generate user data that includes these and other types of information and provide the user data to the emotion-based authentication service hosted by the server computer.

The emotion-based authentication service can be configured to analyze the user data and, optionally, other data, which can be obtained from data sources such as social networking sites, messaging services, photo sharing applications, and the like. The other data can include photographs, videos, text, or other data and emotions associated with those data as well. The emotion-based authentication service can generate emotion data based on the user data and/or the other data. The emotion data can include one or more records for a particular user or user device, wherein each record can include at least one emotion, at least one piece of data to which the emotion applies (e.g., a photograph, video, or other image; text; a contact name; etc.), and data that identifies a user or user device with which this emotion and piece of data is associated.

The emotion-based authentication service can be configured to perform emotion-based authentication using the emotion data. In particular, the emotion-based authentication service can be configured to generate a challenge and an expected response based on the emotion data. The challenge can include the image or the text, and the expected response can include an identifier of the emotion associated with that image or the text by a user or user device. The emotion-based authentication service can provide the challenge to a user device, and receive a response from the user device. The emotion-based authentication service can determine if the response matches an expected response. If the response matches an expected response, the user device or user can be authenticated, or a transaction can be allowed to proceed. If the response does not match an expected response, the user device or user may not be authenticated, or the transaction may be blocked or not allowed to proceed.

In some embodiments, the emotion-based authentication service can be configured to perform the emotion-based authentication in response to receiving an authentication request (e.g., from a third-party server) or the like. In various embodiments, the third-party server can be in communication with the user device and the server computer, though this is not necessarily the case in all embodiments. The emotion-based authentication service also can be configured to generate an authentication decision, which can inform a requestor or other entity to allow or block transactions (e.g., to allow or block access to a resource hosted by the third-party server, to allow a transaction to complete, etc.) or the like. It should be understood that this example is illustrative, and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for emotion-based authentication service will be described, according to an illustrative embodiment. The operating environment 100 shown in FIG. 1 includes a user device 102. The user device 102 can operate in communication with and/or as part of a communications network ("network") 104, though this is not necessarily the case.

According to various embodiments, the functionality of the user device 102 may be provided by one or more server computers, desktop computers, mobile telephones, laptop computers, smartphones, other computing systems, and the like. It should be understood that the functionality of the user device 102 can be provided by a single device, by two or more similar devices, and/or by two or more dissimilar devices. For purposes of describing the concepts and technologies disclosed herein, the user device 102 is described herein as a mobile communications device such as a smartphone or tablet computer. It should be understood that this embodiment is illustrative, and should not be construed as being limiting in any way.

The user device 102 can execute an operating system 106 and one or more application programs such as, for example, an emotion-based authentication application 108 (abbreviated as "EAA" in FIG. 1). The operating system 106 is a computer program for controlling the operation of the user device 102. The emotion-based authentication application 108 can include an executable program that can be configured to execute on top of the operating system 106 to provide various functions as illustrated and described herein for providing emotion-based authentication.

The emotion-based authentication application 108 can be configured to enable authentication based on emotions. In particular, the emotion-based authentication application 108 can be configured to capture and/or communicate user data 110. The user data 110 can include photos, videos, or other images; emotion information (e.g., an emotional reaction to a particular text or image); text; camera output (e.g., a photo, video, or other image captured by a camera or other imaging system of the user device 102); other information (e.g., time and/or data information associated with the photograph and/or emotion, information associated with communications associated with the photograph and/or emotion information; etc.); combinations thereof; or the like. The user data 110 can be used to provide emotion-based authentication as illustrated and described herein. In particular, the emotion-based authentication application 108 can be configured to capture the user data 110 and to provide the user data 110 to an emotion-based authentication service 112 (abbreviated as "EAS" in FIG. 1). The emotion-based authentication service 112 can interact with the user device 102 and/or the emotion-based authentication application 108 to provide emotion-based authentication as illustrated and described herein.

In particular, the emotion-based authentication service 112 can operate as a callable application or service for providing emotion-based authentication to devices or other entities. In various embodiments of the concepts and technologies disclosed herein, the emotion-based authentication service 112 can be executed by and/or hosted on a computing device such as a server computer 114. According to various embodiments, the functionality of the server computer 114 may be provided by one or more server computers, application servers, desktop computers, laptop computers, other computing systems, and the like. It should be understood that the functionality of the server computer 114 can be provided by a single device, by two or more similar devices, and/or by two or more dissimilar devices. For purposes of describing the concepts and technologies disclosed herein, the server computer 114 is described herein as server computer that functions as an application server. It should be understood that this embodiment is illustrative, and should not be construed as being limiting in any way.

According to various embodiments of the concepts and technologies disclosed herein, the emotion-based authentication service 112 can be configured to receive the user data 110 at various times from the user device 102. As noted above, the user data 110 can include one or more images, passages of text, camera output, and emotion information, among other types of information. In one example embodiment of the concepts and technologies disclosed herein, one instance or received release of the user data 110 can include a photograph and an emotion associated with the photograph. For example, a user (e.g., a user of the user device 102) may upload a photograph to the emotion-based authentication service 112 with an indicator of an emotion of the user when seeing the photograph. The emotion-based authentication service 112 can be configured to store the photograph with data that can identify the emotion and with data that can identify the user associated with the photograph (and emotion). The emotion-based authentication service 112 can store these and/or other data (e.g., text, location, date information, time information, sender/recipient information, etc.) as emotion data 116. Thus, the emotion data 116 can include, in various embodiments, an image such as a photograph or video, an emotion associated with the image, and data identifying a user with whom the image and emotion are associated. It should be understood that this example is illustrative, and therefore should not be construed as being limiting in any way.

According to various embodiments of the concepts and technologies disclosed herein, the emotion data 116 can be generated by the emotion-based authentication service 112 based on the user data 110 obtained from the user device 102 (e.g., captured by the emotion-based authentication application 108 executed by the user device 102). In some embodiments of the concepts and technologies disclosed herein, the emotion-based authentication service 112 can generate the emotion data 116 based on other data 118 that can be received and/or otherwise obtained from one or more data sources 120A-N (hereinafter collectively and/or generically referred to as "data sources 120").

The other data 118 can include, for example, posts associated with a particular user or other entity (e.g., blog posts, social networking posts, comments, articles, etc.); reactions (e.g., reactions to social networking posts, articles, etc.); photos, videos, or other images; emotion information; other information; combinations thereof; or the like. Thus, for example, it can be appreciated that the data sources 120 can include, but are not limited to, social networking services and/or platforms; messaging services, platforms or devices (e.g., email services, text messaging services, instant messaging services, etc.); news sites, news services, and/or other platforms or devices; video, photograph, and/or other image sharing services or platforms; blogging and/or microblogging platforms; combinations thereof; or the like.

The emotion-based authentication service 112 can receive, or otherwise obtain, the other data 118 from the data sources 120 and generate the emotion data 116 based on the other data 118 in addition to, or instead of, the user data 110. In some embodiments of the concepts and technologies disclosed herein, the emotion-based authentication service 112 can be configured to generate the emotion data 116 based on the user data 110 and to update and/or supplement the emotion data 116 using the other data 118. It should be understood that this example is illustrative, and therefore should not be construed as being limiting in any way.

According to various embodiments, the emotion-based authentication service 112 can communicate with the user device 102, for example via the emotion-based authentication application 108, to obtain the user data 110. In some embodiments, for example, a user or other entity associated with the user device 102 can register and/or opt-in to use the emotion-based authentication service 112. Thus, for example, a user or other entity can opt-in to use emotion-based authentication, create an account for emotion-based authentication, and setup the account by, for example, uploading an image or text and an emotion associated with the image or text. At some future time, the user can be challenged during authentication by providing the image or text and querying for the emotion associated with the image or text by the user (e.g., as stored in the emotion data 116). Of course, it can be appreciated that a user could be challenged by providing an emotion and being challenged to select a matching image or text, so the above example embodiment is illustrative and should not be construed as being limiting in any way.

According to some embodiments, for example, the user device 102 may attempt to access a resource 122, for example an application, web page, service, data host, or other resource hosted or executed by a third-party server 124. As used herein and in the claims, the phrase "third-party" is used to refer to a party other than the user (of the user device 102) or a service provider that provides the emotion-based authentication service 112. It should be understood that this example is illustrative, and therefore should not be construed as being limiting in any way.

The third-party server 124 can be configured to communicate with the emotion-based authentication service 112 to provide emotion-based authentication of the user (of the user device 102) or the user device 102 itself before providing access to the resource 122. According to various embodiments of the concepts and technologies disclosed herein, the third-party server 124 can be configured to generate an authentication request 126 (labeled "auth. request 126" in FIG. 1). The authentication request 126 can identify the user device 102 (or the user thereof) that is attempting to access the resource 122, and can request that the emotion-based authentication service 112 authenticate the user device 102 (or the user thereof) before providing the resource 122 to the requestor (e.g., the user or the user device 102).

The emotion-based authentication service 112 can be configured to receive the authentication request 126 and to identify the user or user device 102 associated with the authentication request 126. The emotion-based authentication service 112 can be configured to determine if the user device 102 (or the user) identified in the authentication request 126 is registered with the emotion-based authentication service 112 (e.g., that the user or user device 102 has opted-in to use emotion-based authentication and/or that at least one image or text passage exists with which to challenge the user or user device 102). If no opt-in and/or setup has been obtained/completed, the emotion-based authentication service 112 can deny the emotion-based authentication. It should be understood that this example is illustrative, and therefore should not be construed as being limiting in any way.

Upon determining that the user and/or user device 102 identified in the authentication request 126 has opted-in to use emotion-based authentication, the emotion-based authentication service 112 can retrieve or otherwise obtain emotion data 116 associated with the user or user device 102. According to various embodiments of the concepts and technologies disclosed herein, the emotion data 116 associated with the user or user device 102 can include at least one image or text, and at least one emotion associated with the image or text. It should be understood that this example is illustrative, and therefore should not be construed as being limiting in any way.

Thus, the emotion-based authentication service 112 can obtain the emotion data 116 associated with the user or user device 102. The emotion-based authentication service 112 can generate, based on the emotion data 116, a challenge 128 and an expected response to the challenge 128. For example, if the user or user device 102 uploaded a photograph with an emotion such as "happy," the emotion-based authentication service 112 can generate a challenge 128 that includes the photograph and a query for an emotion identified by the user or user device 102 for the photograph. In some embodiments, the emotion-based authentication service 112 can generate a multiple choice query to function as the challenge 128, while in some other embodiments the challenge 128 may include the photograph and invite the user or user device 102 to identify the emotion from a list. Because the challenge 128 can be formatted in multiple other formats, it should be understood that these examples are illustrative, and therefore should not be construed as being limiting in any way.

The emotion-based authentication service 112 can send the challenge 128 to the user device 102, and the user device 102 can present the challenge 128 to the user or other entity, for example via a screen display, which can be generated in some embodiments by the emotion-based authentication application 108. The screen display can present the photograph and request identification of the emotion by the user or other entity. In the example noted above, where multiple choices are presented, the user or other entity can select one of the emotions presented and the emotion-based authentication application 108 can send data identifying the selection to the emotion-based authentication service 112 as the response 130. It should be understood that this example is illustrative, and therefore should not be construed as being limiting in any way.

The emotion-based authentication service 112 can receive the response 130 and determine, based on the challenge 128 and the expected response 130, if the user device 102 and/or the user should be authenticated (e.g., that the response 130 matches the expected response). If the emotion-based authentication service 112 determines that the user and/or user device 102 should be authenticated, the emotion-based authentication service 112 can generate data or a command that indicates that the user or user device 102 has been authenticated. This data or command can be provided to the third-party server 124 as the authentication decision 132 (labeled "auth. decision 132") in FIG. 1, and the third-party server 124 can manage access to the resource 122 based on the authentication decision 132. For example, if the authentication decision 132 indicates that the user or user device 102 has been authenticated, the third-party server 124 can allow the user device 102 and/or the user to access the resource 122. Alternatively, if the authentication decision 132 indicates that the user or user device 102 has not been authenticated, the third-party server 124 can block the user device 102 and/or the user from accessing the resource 122. It should be understood that this example is illustrative, and therefore should not be construed as being limiting in any way.

In some embodiments, the emotion-based authentication service 112 can be hosted by other devices and/or entities, and as such, it should be understood that the functionality of the emotion-based authentication service 112 can be incorporated into other devices or entities (e.g., an application server can use emotion-based authentication to enable or block access to an application). As such, the example embodiment that includes a third-party server 124 should be understood as being illustrative and should not be construed as being limiting in any way.

In another embodiment of the concepts and technologies disclosed herein, the emotion-based authentication illustrated and described herein can be supplemented with camera output from the user device 102. Thus, for example, the emotion-based authentication service 112 can be configured to learn facial expressions of the user to determine emotions of the user based on certain stimuli (e.g., certain images, text, video, or the like). This learning of the emotion-based authentication service 112 can occur, in some embodiments, by presenting images or text to the user device 102, monitoring facial expressions of a user of the user device 102, and obtaining emotion identifiers from the user. Thus, the emotion-based authentication service 112 can associate certain facial expressions with certain emotions. Thus, the emotion-based authentication service 112 can be configured to determine, based on facial expressions during viewing certain photographs or text, if the user of the user device 102 is the same user who configured the emotion-based authentication provided by the emotion-based authentication service 112. For example, if a particular image is associated with a facial expression of "happy" and an emotion of "happy," the emotion-based authentication service 112 can authenticate a user by showing the photograph and determining if the viewer of the photograph is happy when shown the photograph. It should be understood that this example is illustrative, and therefore should not be construed as being limiting in any way.

In practice, a user device 102 can operate in communication with a server computer 114, for example via a network 104. The user device 102 can execute an emotion-based authentication application 108 that can be configured to obtain data (e.g., images, text, or other data) and information that can identify an emotion or emotional responses to the data from the user device 102. The emotion-based authentication application 108 also can be configured to capture camera output, in some embodiments, as well as other information such as messages, date and time information, location information, reactions to images or text, combinations thereof, or the like. The emotion-based authentication application 108 can generate user data 110 that can include these and other types of information, and provide the user data 110 to the emotion-based authentication service 112 hosted by the server computer 114.

The emotion-based authentication service 112 can be configured to analyze the user data 110 and, optionally, other data 118, which can be obtained from one or more data sources 120 such as, for example, social networking sites, messaging services, photo sharing applications, and the like. The other data 118 can include photographs, videos, text, or other data and emotions associated with those data as well. The emotion-based authentication service 112 can generate emotion data 116 based on the user data 110 and/or the other data 118. The emotion data 116 can include one or more records for a particular user or user device 102, wherein each record can include at least one emotion, at least one piece of data to which the emotion applies (e.g., a photograph, video, or other image; text; a contact name; etc.), and data that can identify a user or user device 102 with which this emotion and piece of data is associated.

The emotion-based authentication service 112 can be configured to perform emotion-based authentication using the emotion data 116. In particular, the emotion-based authentication service 112 can be configured to generate a challenge 128 and an expected response based on the emotion data 116. The challenge 128 can include the image or the text, and the expected response can include an identifier of the emotion associated with that image or the text by a user or user device 102. The emotion-based authentication service 112 can provide the challenge 128 to a user device 102, and receive a response 130 from the user device 102. The emotion-based authentication service 112 can determine if the response 130 matches an expected response. If the response 130 matches an expected response, the user device 102 or user can be authenticated, or a transaction can be allowed to proceed. If the response 130 does not match an expected response, the user device 102 or user may not be authenticated, or the transaction may be blocked or not allowed to proceed.

In some embodiments, the emotion-based authentication service 112 can be configured to perform the emotion-based authentication in response to receiving an authentication request 126 (e.g., from a third-party server 124) or the like. In various embodiments, the third-party server 124 can be in communication with the user device 102 and the server computer 114, though this is not necessarily the case in all embodiments. The emotion-based authentication service 112 also can be configured to generate an authentication decision 132, which can inform a requestor or other entity (e.g., the third-party server 124) to allow or block transactions (e.g., to allow or block access to a resource 122 hosted by the third-party server 124, to allow a transaction to complete, etc.) or the like. It should be understood that this example is illustrative, and therefore should not be construed as being limiting in any way.

FIG. 1 illustrates one user device 102, one network 104, one server computer 114, multiple data sources 120, and one third-party server 124. It should be understood, however, that various implementations of the operating environment 100 can include one or more than one user device 102; one or more than one network 104; zero, one, or more than one server computer 114; zero, one, or more than one data source 120; and/or zero, one, or more than one third-party server 124. As such, the illustrated embodiment should be understood as being illustrative, and should not be construed as being limiting in any way.

Figure 2:
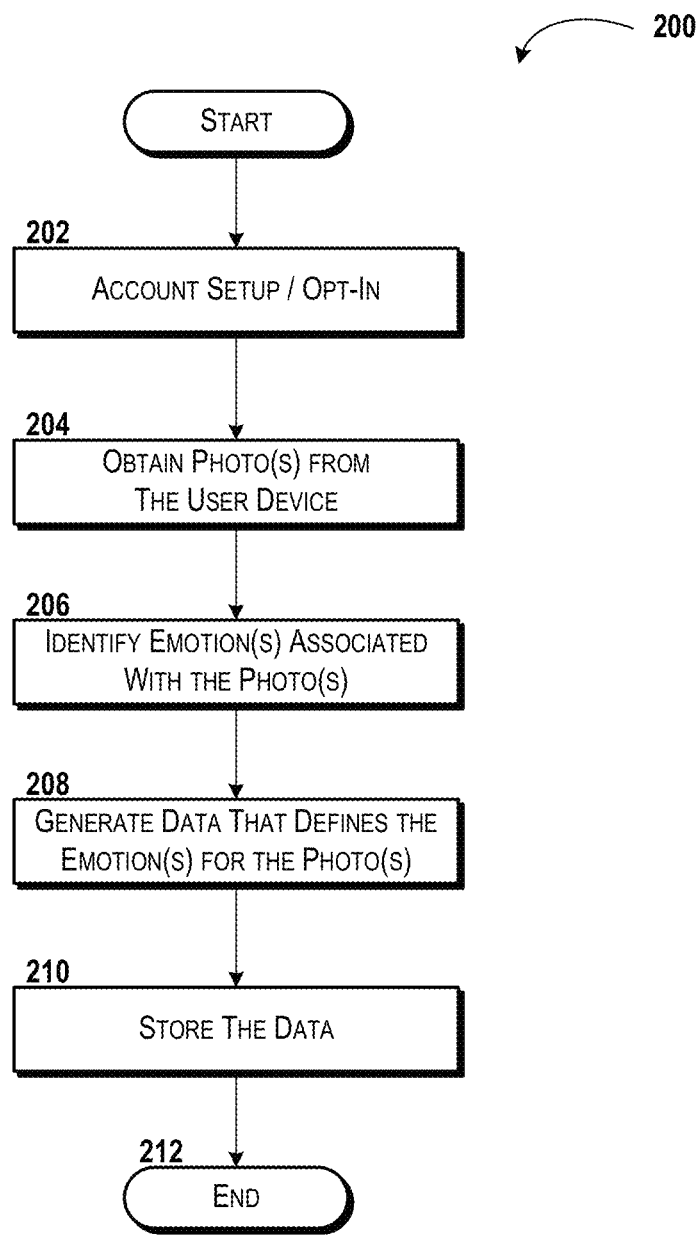
FIG. 2 is a flow diagram showing aspects of a method for creating emotion data for use by an emotion-based authentication service, according to an illustrative embodiment of the concepts and technologies described herein.

Turning now to FIG. 2, aspects of a method 200 for creating emotion data for use by an emotion-based authentication service 112 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the user device 102 and/or the server computer 114, to perform one or more operations and/or causing the processor to direct other components of the computing system or device to perform one or more of the operations.

For purposes of illustrating and describing the concepts of the present disclosure, the method 200 is described herein as being performed by the server computer 114 via execution of one or more software modules such as, for example, the emotion-based authentication service 112. It should be understood that additional and/or alternative devices and/or network nodes can provide the functionality described herein via execution of one or more modules, applications, and/or other software including, but not limited to, the emotion-based authentication service 112. Thus, the illustrated embodiments are illustrative, and should not be viewed as being limiting in any way.

The method 200 begins at operation 202. At operation 202, the server computer 114 can perform an account setup and/or opt-in process with a device or user, for example the user device 102. As explained above, the account setup or opt-in process can include an entity (e.g., a user of the user device 102) indicating that emotion-based authentication can be used to authenticate the user or user device 102. As explained above, and as will be explained below, the account setup and/or opt-in can include providing an emotion associated with at least one piece of data such as an image, a text, or the like. In some embodiments, a user or other entity can provide an emotion associated with multiple pieces of data (e.g., images, text, or the like) as part of the account setup and/or opt-in processes, or at other times. For purposes of clarity, the example of using photos, videos, or other images for emotion-based authentication will be illustrated and described herein with reference to FIG. 2. In light of the description herein of using text or other data for the emotion-based authentication, however, it should be understood that this embodiment is illustrative and should not be construed as being limiting in any way.

From operation 202, the method 200 can proceed to operation 204. At operation 204, the server computer 114 can obtain one or more photos, videos, or other images from the user device 102. According to various embodiments of the concepts and technologies disclosed herein, a user can select one or more images from a library or other storage device (e.g., a memory of the user device 102) to provide to the server computer 114. In some other embodiments, the user can activate a camera or other imaging device to capture one or more images to provide to the server computer 114. The images can be selected and/or created, in various embodiments, using the emotion-based authentication application 108 executed by the user device 102 and/or via a portal, website, or other functionality exposed by the server computer 114 (e.g., via the emotion-based authentication service 112). As such, operation 204 can include receiving or obtaining the images from the user device 102 or other devices, as well as obtaining the images via a portal, website, or other functionality associated with the server computer 114.

From operation 204, the method 200 can proceed to operation 206. At operation 206, the server computer 114 can identify one or more emotions associated with each of the one or more images (e.g., photos) obtained in operation 204. According to various embodiments of the concepts and technologies disclosed herein, the user can be shown a list or hierarchy of emotions (e.g., an emotion wheel, an emotion tree, or the like). The use of an emotion wheel can be helpful, in some embodiments, by ensuring that a user or other entity selects a specifically defined emotion (e.g., an emotion "joyful" can fall under content and happy, in some hierarchies). Thus, the emotion-based authentication service 112 can use such an approach to generalize an emotion (e.g., "happy" as a general emotion for the specific emotion "content") and/or for other reasons. An example of a suitable emotion wheel is illustrated and described herein with reference to FIG. 9. It should be understood that this example is illustrative, and therefore should not be construed as being limiting in any way.

According to various embodiments, a user or other entity can select an image or be presented with the image with functionality for specifying one or more emotions associated with the image. For example, a user interface can be generated for displaying the image and one or more general emotions. Upon selecting a general emotion, the user interface can be updated to show a second level (more specific) emotion that can be based on the general emotion. Upon selecting a second level emotion, the user interface can be updated again to show a third level (yet more specific) emotion, for example. Various numbers of levels can be shown in some embodiments from one level to three or more than three levels. In the above example of "content," a general emotion of happy can be selected, followed by "joyful," and followed by "content." It should be understood that this example is illustrative, and therefore should not be construed as being limiting in any way.

Thus, it can be appreciated that operation 206 can be performed for each image provided by the user or user device 102. As such, operation 206 can include identifying an emotion for each of the multiple images provided in operation 204, in some embodiments. It should be understood that this example is illustrative, and therefore should not be construed as being limiting in any way.

From operation 206, the method 200 can proceed to operation 208. At operation 208, the server computer 114 can generate data that can identify and/or define the one or more emotions for the one or more images provided in operation 204. Thus, operation 208 can include, for example, generating the emotion data 116 as illustrated and described above with reference to FIG. 1. Thus, operation 208 can include generating the emotion data 116, where the emotion data 116 generated in operation 208 can include the one or more images provided in operation 204, data identifying one or more emotions associated with the one or more images, and data identifying one or more users or devices (e.g., the user device 102) associated with the images and the emotions. Thus, the emotion data 116 can be accessed at some point after creation to identify a user or device, an image associated with that user or device, and an emotion specified for that image by that user or device. It should be understood that this example is illustrative, and therefore should not be construed as being limiting in any way.

From operation 208, the method 200 can proceed to operation 210. At operation 210, the server computer 114 can store the data generated in operation 208, for example the emotion data 116. The emotion data 116 can be stored at the server computer 114, at a data storage device accessible to the server computer 114, and/or at other data storage locations. Although not illustrated in FIG. 2, it should be understood that upon receiving a future release or instance of user data 110, the server computer 114 can update the emotion data 116 to include the new user data 110, in some embodiments. It should be understood that this example is illustrative, and therefore should not be construed as being limiting in any way.

From operation 210, the method 200 can proceed to operation 212. The method 200 can end at operation 212.

Figure 3:
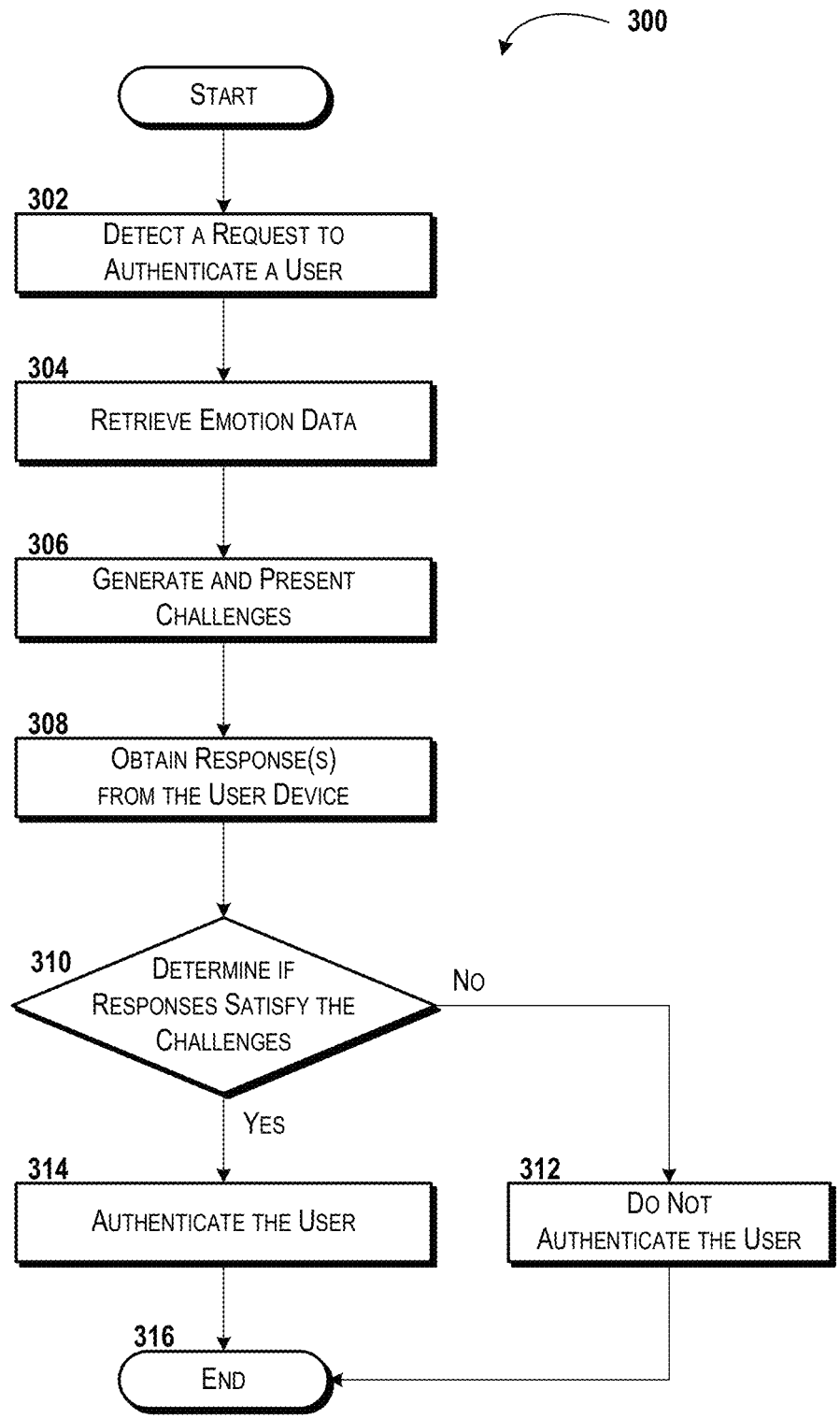
FIG. 3 is a flow diagram showing aspects of a method for providing an emotion-based authentication service, according to an illustrative embodiment of the concepts and technologies described herein.

Turning now to FIG. 3, aspects of a method 300 for providing an emotion-based authentication service 112 will be described in detail, according to an illustrative embodiment. The method 300 begins at operation 302. At operation 302, the server computer 114 can detect a request to authenticate a user or device (e.g., the user device 102). In some embodiments, the server computer 114 can detect the request in operation 302 by receiving an authentication request 126 from a device or entity such as the third-party server 124 or another device, application, service, or the like. As illustrated and described above with reference to FIG. 1, a device such as the third-party server 124 can be registered with the emotion-based authentication service 112 to allow emotion-based authentication of a user or device during communications between the third-party server 124 and the user or device. Thus, operation 302 can correspond to the server computer 114 receiving a request or application call to perform emotion-based authentication of a particular user or device. It should be understood that this example is illustrative, and therefore should not be construed as being limiting in any way.

From operation 302, the method 300 can proceed to operation 304. At operation 304, the server computer 114 can retrieve emotion data 116, for example, a portion or instance of the emotion data 116 that is associated with a user being authenticated. Thus, operation 304 can include the server computer 114 identifying the user or device being authenticated (e.g., by identifying a user or device associated with the authentication request 126 received in operation 302), and can identify one or more portions of emotion data 116 associated with the user or device. As noted above, the emotion data 116 can be associated with a particular user or device, so operation 304 can include identifying the user or device, and querying the emotion data 116 to identify portions of the emotion data 116 associated with that user or device.

In some embodiments, for example, the authentication request 126 can identify the user or device (e.g., the user device 102). In particular, the third-party server 124 (or other device) can identify the device communicating with the third-party server 124 (e.g., via an IP address, a user name, a MAC address, a network ID, etc.) and provide that identification to the emotion-based authentication service 112 with the authentication request 126. The server computer 114 can therefore be configured to analyze the authentication request 126 and determine, based on information included in the authentication request 126, the user or device for whom/which authentication is being requested (and for whom emotion data 116 is to be retrieved). Because the user and/or device can be identified in additional and/or alternative manners, it should be understood that this example is illustrative, and therefore should not be construed as being limiting in any way.

From operation 304, the method 300 can proceed to operation 306. At operation 306, the server computer 114 can generate and present challenges such as the challenges 128. According to various embodiments of the concepts and technologies disclosed herein, the server computer 114 can analyze the emotion data 116 obtained in operation 304 and determine, based on the analyzed emotion data 116, a challenge 128 to present to the user or user device 102. In particular, because the emotion data 116 includes at least one piece of data (e.g., a photograph or other image) and an emotion associated with that piece of data, the challenge 128 generated in operation 306 can be based on the piece of data and the emotion.

For example, the challenge 128 generated in operation 306 can include display data (e.g., renderable data) that, when rendered by a device such as the user device 102, will cause the user device 102 to present the photograph and a query for an emotion that the user or other entity has associated with that photograph. In some embodiments, for example, the challenge 128 can include the photograph or other image and a list of emotions that will be presented with the photograph. The list of emotions can include the emotion associated with the photograph or other image by the user or other entity and other emotions that have not been associated with the photograph or other image by the user or other entity. Thus, for example, if a user has associated a photograph of a dog with an emotion "sad," for example because the dog has died, the challenge 128 can include a list of emotions that someone other than the user may think could apply to the photograph (e.g., happy, loved, sad, excited, or the like). In some embodiments, a more specific emotion may be required (e.g., when heightened security is in order).

In some embodiments, the challenge 128 can include a single emotion and a number of photographs including the photograph that has been associated with the emotion by the user or other entity. Thus, an entity other than the user may not be able to pick the correct image associated with the emotion, thereby failing to authenticate using the emotion-based authentication service 112. In yet other embodiments, the challenge 128 generated by the server computer 114 can include combinations of emotions and/or images (or other data as illustrated and described herein), to further lessen the likelihood that any entity other than the user who designated the emotion(s) with the image(s) can a successfully authenticate.

For example, the challenge 128 can include multiple images and lists of emotions that must be in the correct order, relative to the order of the images. Alternatively, a list of emotions can be presented and the user may be challenged to pick, from multiple images, the images in a correct order relative to the listed emotions. It can be appreciated that other variations of using multiple images and/or multiple emotions can be used to challenge a user for emotion-based authentication as illustrated and described herein. As such, the above examples are illustrative and should not be construed as being limiting in any way.

In operation 306, the server computer 114 also can provide the challenge 128 to the user device 102. Thus, for example, the server computer 114 can transmit, to the user device 102, data for rendering the images and/or data for presenting the emotions. In other embodiments, the server computer 114 can present the photographs and/or emotions in a web page or other interface, so the server computer 114 may render the page and enable access to the page by the user device 102. In yet other embodiments, the server computer 114 may transmit data to the user device 102 for rendering in the appropriate format by the emotion-based authentication application 108. Because the image(s) and the emotion(s) can be provided and/or rendered in various manners, it should be understood that these examples are illustrative, and therefore should not be construed as being limiting in any way.

From operation 306, the method 300 can proceed to operation 308. At operation 308, the server computer 114 can obtain responses from the user device 102, for example, the responses 130. In operation 308, the server computer 114 can receive an indication of the emotion(s) and/or image(s) selected by the user device 102 or other device, or receive a response 130 that indicates the selections. Thus, operation 308 can include various methods of detecting an indication of an image, emotion, or the like by the user or other entity associated with the user device 102.

From operation 308, the method 300 can proceed to operation 310. At operation 310, the server computer 114 can determine if the responses 130 obtained in operation 308 satisfy the challenges 128 presented in operation 306. In particular, the server computer 114 can determine if the expected response (e.g., an emotion expected to be indicated in association with a presented image, an image expected to be indicated in association with a presented emotion, an order of emotions expected to be indicated in association with a presented set of images, an order of images expected to be indicated in association with a presented set of emotions, etc.) matches the response 130 obtained in operation 308 (e.g., received from the user device 102). Thus, the server computer 114 can compare the response 130 obtained to the expected response to see if the response 130 obtained matches what was expected.

In some embodiments, the server computer 114 can apply an error threshold to the images and/or emotions, or take into account how time can change such emotions. For example, if five images are presented, the server computer 114 can require a percentage of at least seventy percent accuracy (with five images, this would require four out of five) to be considered correct. Such an approach can allow for emotion-based authentication without being overly cumbersome in some environments. In some other applications, the server computer 114 can be configured to enforce a one hundred percent accuracy requirement, if desired. It should be understood that these examples are illustrative, and therefore should not be construed as being limiting in any way.

If the server computer 114 determines, in operation 310, that the responses 130 do not satisfy the challenges 128, the method 300 can proceed to operation 312. At operation 312, the server computer 114 can decline to authenticate the user or user device 102 for which authentication was requested in operation 302. Thus, for example, the server computer 114 can be configured to generate and issue an authentication decision 132 that can indicate that the user or user device 102 has not been authenticated, with the authentication decision 132 being issued to one or more entities (e.g., the third-party server 124, the resource 122, or other entities). In some other embodiments, for example where the functionality of the emotion-based authentication service 112 is incorporated into other applications or services, the server computer 114 can deny access to the user device 102 if the determination is made in operation 310 that the provided response 130 did not satisfy the challenge 128 (e.g., that the expected response was not matched by the response 130).

If the server computer 114 determines, in operation 310, that the responses 130 satisfy the challenges 128, the method 300 can proceed to operation 314. At operation 314, the server computer 114 can authenticate the user or user device 102 for which authentication was requested in operation 302. Thus, for example, the server computer 114 can be configured to generate and issue an authentication decision 132 that can indicate that the user or user device 102 should be authenticated to one or more entities (e.g., the third-party server 124, the resource 122, or other entities). In some other embodiments, for example where the functionality of the emotion-based authentication service 112 is incorporated into other applications or services, the server computer 114 can allow access if the determination is made in operation 310 that the provided response 130 matched the expected response.

From operation 314, the method 300 can proceed to operation 316. The method 300 also can proceed to operation 316 from operation 312. The method 300 can end at operation 316.

Figure 4:
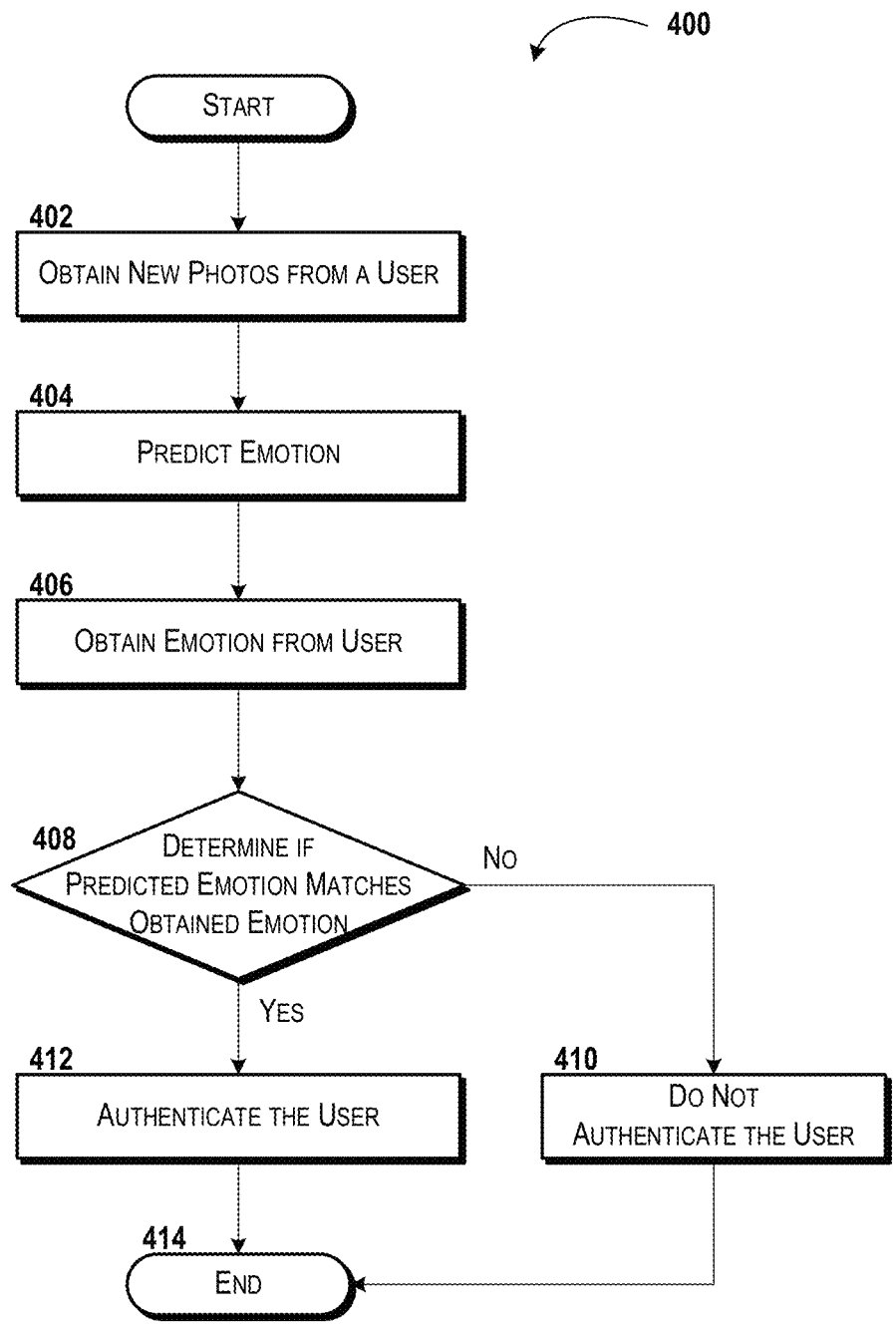
FIG. 4 is a flow diagram showing aspects of a method for providing an emotion-based authentication service, according to another illustrative embodiment of the concepts and technologies described herein.

Turning now to FIG. 4, aspects of a method 400 for providing an emotion-based authentication service 112 will be described in detail, according to an illustrative embodiment. The method 400 begins at operation 402. At operation 402, the server computer 114 can obtain new photos from (or associated with) an existing user, e.g., the user associated with the user device 102. According to various embodiments of the concepts and technologies disclosed herein, the server computer 114 can obtain the new photos from the user device 102 or from one or more of the data sources 120. Thus, for example, the new photos can be obtained from messaging platforms, blog sites, social networking sites, the user device 102, or other devices or platforms.

From operation 402, the method 400 can proceed to operation 404. At operation 404, the server computer 114 (e.g., via the emotion-based authentication service 112) can analyze the new photos obtained in operation 402 and predict an emotion. In particular, some embodiments of the emotion-based authentication service 112 can include one or more neural networks and/or machine learning entities. Thus, the emotion-based authentication service 112 can be configured to analyze the emotion data 116 and determine, based on the machine learning and/or neural networks, how the user or other entity associated with the emotion data 116 can be expected to emotionally react to certain new photos. Thus, the server computer 114 can predict an emotional response based on machine learning and the emotion data 116.

By way of example, the emotion-based authentication service 112 may determine that any photograph of a butterfly has been "loved" by the user or other entity associated with the emotion data 116. Thus, the emotion-based authentication service 112 may determine, in one contemplated embodiment of operation 404, that a new photo of a butterfly will be "loved" by the user or other entity associated with the emotion data 116. This is merely a simple example of how neural networks and/or machine learning can analyze the emotion data 116 to predict how the entity associated with that emotion data 116 will react to a new photograph obtained in operation 402. It should be understood that this example is illustrative, and therefore should not be construed as being limiting in any way.

From operation 404, the method 400 can proceed to operation 406. At operation 406, the server computer 114 can obtain an emotion from the user or user device 102. In operation 406, for example, the server computer 114 can present one or more of the new photos obtained in operation 402 to the user or user device 102 and challenge the user or user device 102 for an emotion associated with the new photos. Thus, in the example of the butterfly photograph mentioned above, operation 406 can include providing the new butterfly photo to the user or user device 102 and asking for an emotion based on the photograph. In some embodiments, the emotion can be entered by a user or other entity, and in some other embodiments the emotion may be selected from a list that can be presented in operation 406 (e.g., a list that includes "love" among other emotions). Thus operation 406 can include obtaining, from the user or other entity (or from the user device 102), an indication of an emotion associated with one or more of the new photos obtained in operation 402.

From operation 406, the method 400 can proceed to operation 408. At operation 408, the server computer 114 can determine if the predicted emotion (e.g., the emotion predicted in operation 404 for a particular photo) matches the emotion obtained in operation 406. Thus, for example, if the user or other entity entered "love" for a new butterfly photograph, as noted above, such an emotion would match the expected emotion as predicted by the emotion-based authentication service 112 in operation 404. It should be understood that this example is illustrative, and therefore should not be construed as being limiting in any way.

If the server computer 114 determines, in operation 408, that the predicted emotion does not match the obtained emotion, the method 400 can proceed to operation 410. At operation 410, the server computer 114 can decline to authenticate the user and/or user device associated with the new photos obtained in operation 402. Such a determination can be made, for example, based on an assumption that the user device 102 may have been compromised and the new photos obtained in operation 402 (e.g., from the user device 102) may have been obtained without consent. Alternatively, the determination may be based on an assumption that the entity currently attempting to authenticate with the server computer 114 is not the user associated with the emotion data 116. Because the decision to decline authentication can be based on these and/or other considerations, it should be understood that these examples are illustrative, and therefore should not be construed as being limiting in any way.

If the server computer 114 determines, in operation 408, that the predicted emotion does match the obtained emotion, the method 400 can proceed to operation 412. At operation 412, the server computer 114 can authenticate the user and/or user device associated with the new photos obtained in operation 402.

From operation 412, the method 400 can proceed to operation 414. The method 400 also can proceed to operation 414 from operation 410. The method 400 can end at operation 414.

Figure 5:
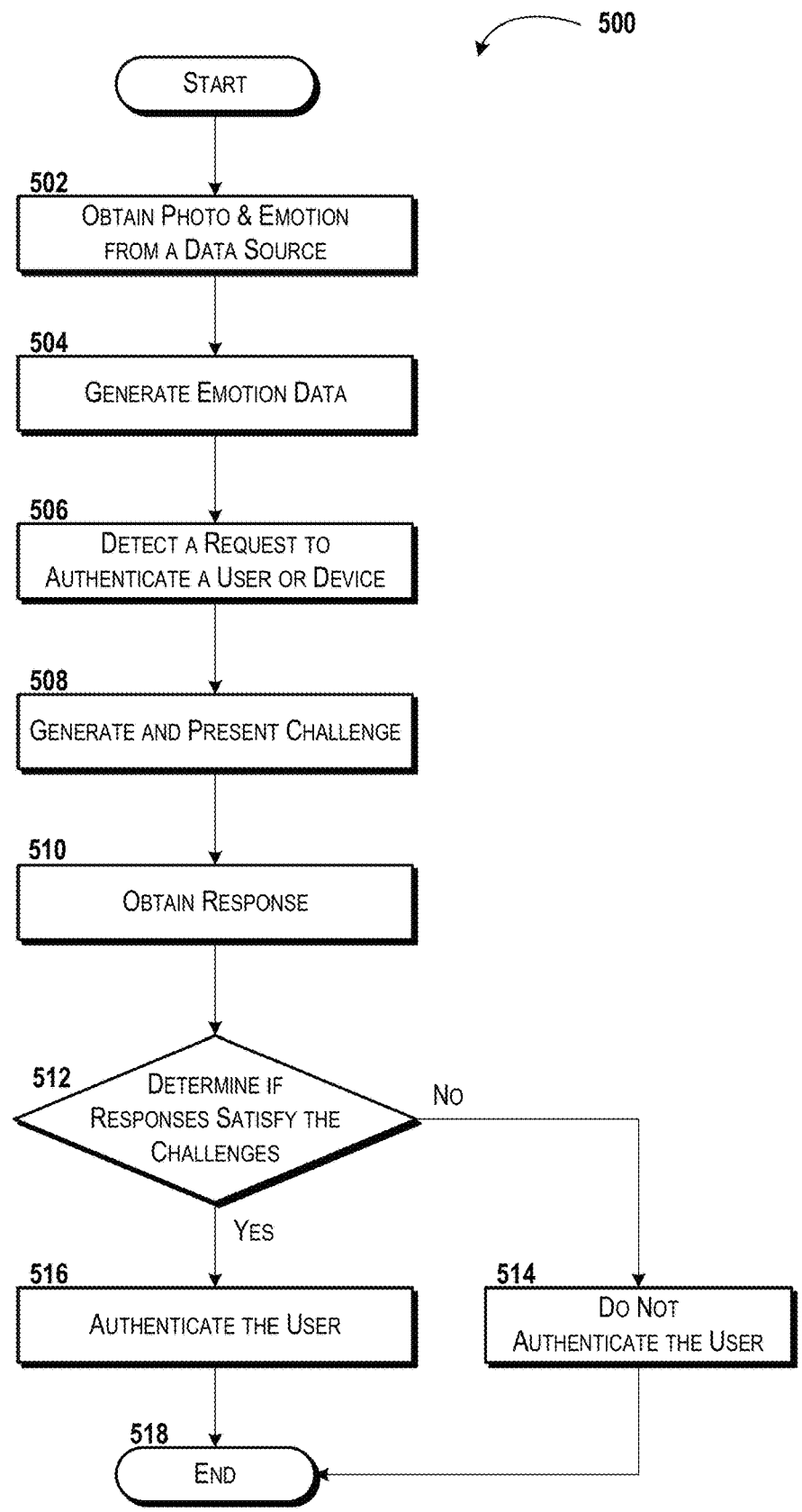
FIG. 5 is a flow diagram showing aspects of a method for providing an emotion-based authentication service, according to another illustrative embodiment of the concepts and technologies described herein.

Turning now to FIG. 5, aspects of a method 500 for providing an emotion-based authentication service 112 will be described in detail, according to an illustrative embodiment. The method 500 begins at operation 502. At operation 502, the server computer 114 can obtain data (e.g., a photograph or other image, text, etc.) and an emotion from a data source such as one of the data sources 120. According to various embodiments of the concepts and technologies disclosed herein, the data sources 120 can include various data sources 120 other than the user device 102 (which is illustrated and described herein with reference to FIG. 2, among other FIGURES).

Thus, as explained herein, the photograph or other image (or text, etc.) can be obtained from a social networking post, from a text message sent and/or received by the data source 120, an email, a blog post, etc. Thus, the emotion associated with the photograph or other data may be explicit or implicit. For example, if a social networking post, email, or text message (for example) includes an image and a statement by the user about an emotion (e.g., "I love this photograph!"), the server computer 114 can determine, in operation 502, an emotion associated with that photograph is "love." It should be understood that this example is illustrative, and therefore should not be construed as being limiting in any way.

From operation 502, the method 500 can proceed to operation 504. At operation 504, the server computer 114 can generate emotion data 116 based on the photo and emotion obtained in operation 502. Thus, the server computer 114 can generate emotion data 116 associated with the user or user device 102, where the emotion data 116 includes the photograph and emotion obtained in operation 502, as well as an identifier that identifies the user or user device 102. It should be understood that this example is illustrative, and therefore should not be construed as being limiting in any way.

From operation 504, the method 500 can proceed to operation 506. At operation 506, the server computer 114 can detect a request to authenticate a user. In some embodiments, the server computer 114 can detect the request in operation 506 by receiving an authentication request 126 from a device or entity such as the third-party server 124 or another device, application, service, or the like. As explained above, various devices and/or entities (e.g., the third-party server 124) can be registered with the emotion-based authentication service 112 to allow emotion-based authentication of a user or device during communications between the third-party server 124 and the user or device. Thus, operation 506 can correspond to the server computer 114 receiving a request or application call to perform emotion-based authentication of a particular user or device. It should be understood that this example is illustrative, and therefore should not be construed as being limiting in any way.

From operation 506, the method 500 can proceed to operation 508. At operation 508, the server computer 114 can generate and present challenges such as the challenges 128. Thus, operation 508 can include the server computer 114 analyzing the emotion data 116 obtained in operation 504 to determine, based on the analyzed emotion data 116, a challenge 128 to present to the user or user device 102. For example, the challenge 128 generated in operation 508 can include data for presenting the photograph and a query for an emotion that the user or other entity has associated with that photograph; an emotion and a number of photographs including the photograph that has been associated with the emotion by the user or other entity; combinations of emotions and/or images (or other data as illustrated and described herein); a list of emotions in a particular order and a request for the user to pick, from multiple images, the images in a correct order relative to the listed emotions; and/or other variations of using multiple images and/or multiple emotions as illustrated and described herein.

In operation 508, the server computer 114 also can provide the challenge 128 to the user device 102. Thus, for example, the server computer 114 can transmit, to the user device 102, data for rendering the images and/or data for presenting the emotions. In other embodiments, the server computer 114 can present the photographs and/or emotions in a web page or other interface, so the server computer 114 may render the page and enable access to the page by the user device 102. In yet other embodiments, the server computer 114 may transmit data to the user device 102 for rendering in the appropriate format by the emotion-based authentication application 108. Because the image(s) and the emotion(s) can be provided and/or rendered in various manners, it should be understood that these examples are illustrative, and therefore should not be construed as being limiting in any way.

From operation 508, the method 500 can proceed to operation 510. At operation 510, the server computer 114 can obtain responses from the user device 102, for example, the responses 130. In operation 510, the server computer 114 can receive an indication of the emotion(s) and/or image(s) selected or specified by the user device 102 or other device, or receive a response 130 that indicates the selections or specifications. Thus, operation 510 can include various methods of detecting an indication of an image, emotion, or the like by the user or other entity associated with the user device 102. It should be understood that this example is illustrative, and therefore should not be construed as being limiting in any way.

From operation 510, the method 500 can proceed to operation 512. At operation 512, the server computer 114 can determine if the responses 130 obtained in operation 508 satisfy the challenges 128 presented in operation 506. In particular, the server computer 114 can determine if the expected response (e.g., an emotion expected to be indicated in association with a presented image, an image expected to be indicated in association with a presented emotion, an order of emotions expected to be indicated in association with a presented set of images, an order of images expected to be indicated in association with a presented set of emotions, etc.) matches the response 130 obtained in operation 510 (e.g., received from the user device 102). Thus, the server computer 114 can compare the response 130 obtained in operation 510 to the expected response to see if the response 130 obtained matches what was expected. As noted above, one or more error thresholds can be applied, in some embodiments, in operation 512. It should be understood that this example is illustrative, and therefore should not be construed as being limiting in any way.

If the server computer 114 determines, in operation 512, that the responses 130 do not satisfy the challenges 128, the method 500 can proceed to operation 514. At operation 514, the server computer 114 can decline to authenticate the user or user device 102 for which authentication was requested in operation 506. Thus, for example, the server computer 114 can be configured to generate and issue an authentication decision 132 that can indicate that the user or user device 102 has not been authenticated, with the authentication decision 132 being issued to one or more entities (e.g., the third-party server 124, the resource 122, or other entities). In some other embodiments, for example where the functionality of the emotion-based authentication service 112 is incorporated into other applications or services, the server computer 114 can deny access to the user device 102 if the determination is made in operation 512 that the provided response 130 did not satisfy the challenge 128 (e.g., that the expected response was not matched by the response 130). It should be understood that this example is illustrative, and therefore should not be construed as being limiting in any way.

If the server computer 114 determines, in operation 512, that the responses 130 satisfy the challenges 128, the method 500 can proceed to operation 516. At operation 516, the server computer 114 can authenticate the user or user device 102 for which authentication was requested in operation 506. Thus, for example, the server computer 114 can be configured to generate and issue an authentication decision 132 that can indicate that the user or user device 102 should be authenticated to one or more entities (e.g., the third-party server 124, the resource 122, or other entities). In some other embodiments, for example where the functionality of the emotion-based authentication service 112 is incorporated into other applications or services, the server computer 114 can allow access if the determination is made in operation 512 that the provided response 130 matched the expected response. It should be understood that this example is illustrative, and therefore should not be construed as being limiting in any way.

From operation 516, the method 500 can proceed to operation 518. The method 500 also can proceed to operation 518 from operation 514. The method 500 can end at operation 518.

Figure 6:
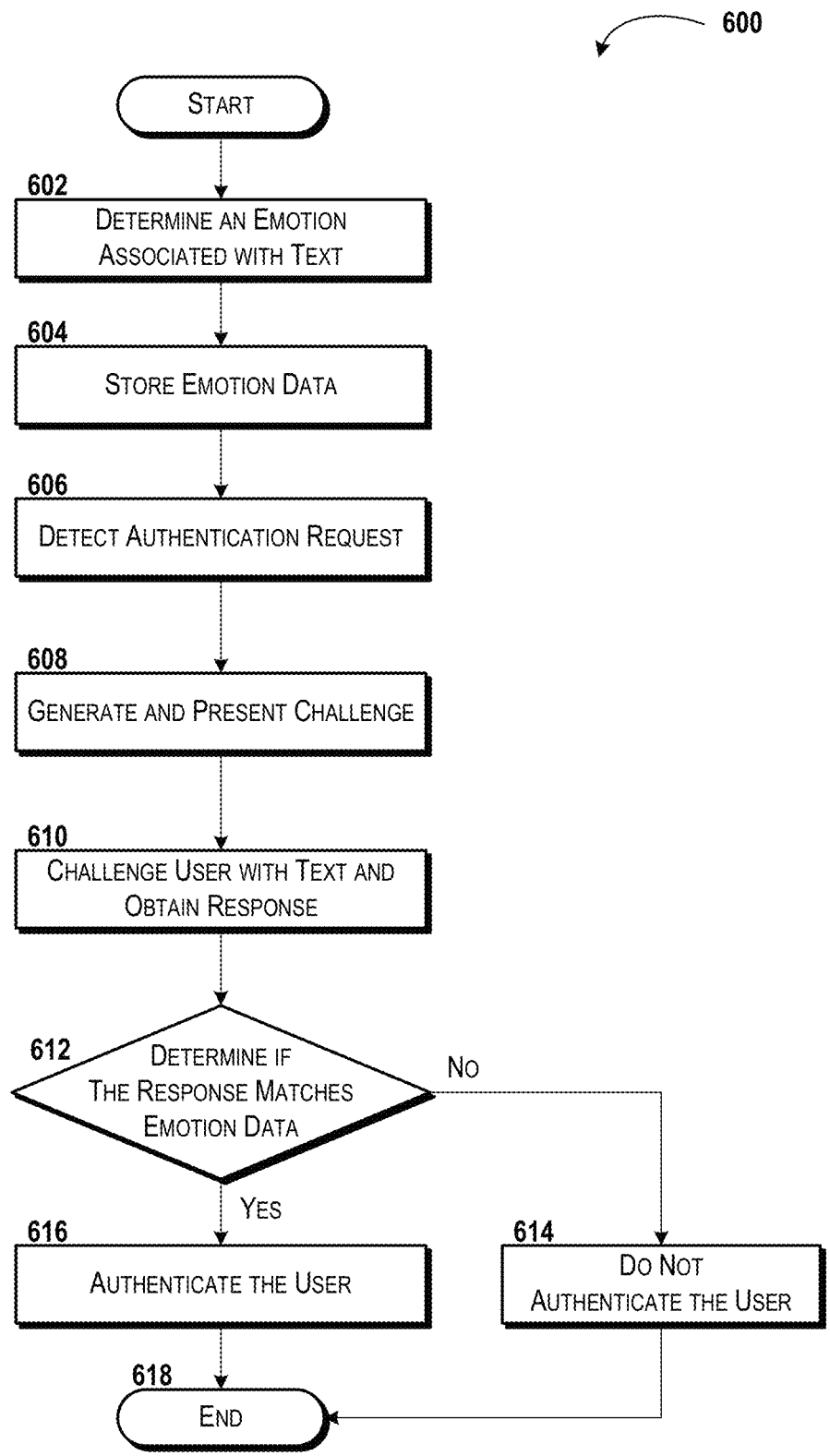
FIG. 6 is a flow diagram showing aspects of a method for providing an emotion-based authentication service, according to another illustrative embodiment of the concepts and technologies described herein.

Turning now to FIG. 6, aspects of a method 600 for providing an emotion-based authentication service 112 will be described in detail, according to an illustrative embodiment. The method 600 begins at operation 602. At operation 602, the server computer 114 can determine an emotion of a user, where the emotion of the user is associated with a block of text, a passage of text, or other instance of text (e.g., a story, an article, a text message, a social networking post, a blog article, a list of names, etc.). In some embodiments, the server computer 114 can present text to a user (e.g., via the user device 102), while in some other embodiments, the server computer 114 can obtain the text and associated emotion from one of the data sources 120, the user device 102, and/or other sources. As such, it can be appreciated that the text with which the emotion is associated can be obtained from the user device 102, the data sources 120, and/or other sources.

From operation 602, the method 600 can proceed to operation 604. At operation 604, the server computer 114 can generate emotion data 116 based on the text and emotion determined in operation 602. Thus, operation 604 can include obtaining and storing the emotion determined in operation 602, as well as the text with which the emotion is associated.

From operation 604, the method 600 can proceed to operation 606. At operation 606, the server computer 114 can detect a request to authenticate a user or device such as, for example, the user device 102. In some embodiments, the server computer 114 can detect the request in operation 606 by receiving an authentication request 126 from a device or entity such as the third-party server 124 or another device, application, service, or the like. As explained above, various devices and/or entities (e.g., the third-party server 124) can be registered with the emotion-based authentication service 112 to allow emotion-based authentication of a user or device during communications between the third-party server 124 and the user or device. Thus, operation 606 can correspond to the server computer 114 receiving a request or application call to perform emotion-based authentication of a particular user or device. It should be understood that this example is illustrative, and therefore should not be construed as being limiting in any way.

From operation 606, the method 600 can proceed to operation 608. At operation 608, the server computer 114 can generate and present a challenge such as the challenge 128. Thus, operation 608 can include the server computer 114 analyzing the emotion data 116 generated, obtained, and/or stored in operation 604 to determine, based on the analyzed emotion data 116, a challenge 128 to present to the user or user device 102. For example, the challenge 128 generated in operation 608 can include data for presenting the text obtained in operation 604 and a query for an emotion that the user or other entity has associated with that text; an emotion and a number of text passages including the text that has been associated with the emotion by the user or other entity; combinations of emotions and/or text passages (or other data as illustrated and described herein); a list of emotions in a particular order and a request for the user to pick, from multiple passages of text, the text passages (e.g., articles, names in a list, etc.) in a correct order relative to the listed emotions; and/or other variations of using multiple text strings and/or blocks of text and/or multiple emotions as illustrated and described herein.

Operation 608 also can include the server computer 114 transmitting or otherwise providing to the user device 102, data for rendering the text and/or data for presenting the emotions. In other embodiments, the server computer 114 can present the text and/or emotions in a web page or other interface, so the server computer 114 may render the page and enable access to the page by the user device 102. In yet other embodiments, the server computer 114 may transmit data to the user device 102 for rendering in the appropriate format by the emotion-based authentication application 108. Because the image(s) and the emotion(s) can be provided and/or rendered in various manners, it should be understood that these examples are illustrative, and therefore should not be construed as being limiting in any way.

From operation 608, the method 600 can proceed to operation 610. At operation 610, the server computer 114 can obtain a response from the user device 102, for example, the response 130. In operation 610, the server computer 114 can receive an indication of the emotion(s) and/or text (or multiple instances of text) selected or specified by the user device 102 or other device, or receive a response 130 that indicates the selections or specifications. Thus, operation 610 can include various methods of detecting an indication of text, an emotion, or the like by the user or other entity associated with the user device 102. It should be understood that this example is illustrative, and therefore should not be construed as being limiting in any way.

From operation 610, the method 600 can proceed to operation 612. At operation 612, the server computer 114 can determine if the response 130 obtained in operation 608 satisfies the challenge 128 presented in operation 606. In particular, the server computer 114 can determine if the expected response (e.g., an emotion expected to be indicated in association with a presented block of text or text string, a block of text or a text string expected to be indicated in association with a presented emotion, an order of emotions expected to be indicated in association with a presented set of text strings or blocks, an order of text expected to be indicated in association with a presented set of emotions, etc.) matches the response 130 obtained in operation 610 (e.g., received from the user device 102). Thus, the server computer 114 can compare the response 130 obtained in operation 610 to the expected response to see if the response 130 obtained matches what was expected. One or more error thresholds can be applied, in some embodiments, in operation 612, if desired. It should be understood that this example is illustrative, and therefore should not be construed as being limiting in any way.

If the server computer 114 determines, in operation 612, that the responses 130 do not satisfy the challenges 128, the method 600 can proceed to operation 614. At operation 614, the server computer 114 can decline to authenticate the user and/or the user device 102 associated with the user. Thus, for example, the server computer 114 can be configured to generate and issue an authentication decision 132 that can indicate that the user or user device 102 has not been authenticated, with the authentication decision 132 being issued to one or more entities (e.g., the third-party server 124, the resource 122, or other entities). In some other embodiments, for example where the functionality of the emotion-based authentication service 112 is incorporated into other applications or services, the server computer 114 can deny access to the user device 102 if the determination is made in operation 612 that the provided response 130 did not satisfy the challenge 128 (e.g., that the expected response was not matched by the response 130). It should be understood that this example is illustrative, and therefore should not be construed as being limiting in any way.

If the server computer 114 determines, in operation 612, that the responses 130 satisfy the challenges 128, the method 600 can proceed to operation 616. At operation 616, the server computer 114 can authenticate the user and/or the user device 102 associated with the user. Thus, for example, the server computer 114 can be configured to generate and issue an authentication decision 132 that can indicate that the user or user device 102 should be authenticated to one or more entities (e.g., the third-party server 124, the resource 122, or other entities). In some other embodiments, for example where the functionality of the emotion-based authentication service 112 is incorporated into other applications or services, the server computer 114 can allow access if the determination is made in operation 612 that the provided response 130 matched the expected response. It should be understood that this example is illustrative, and therefore should not be construed as being limiting in any way.

From operation 616, the method 600 can proceed to operation 618. The method 600 also can proceed to operation 618 from operation 614. The method 600 can end at operation 618.

Figure 7:
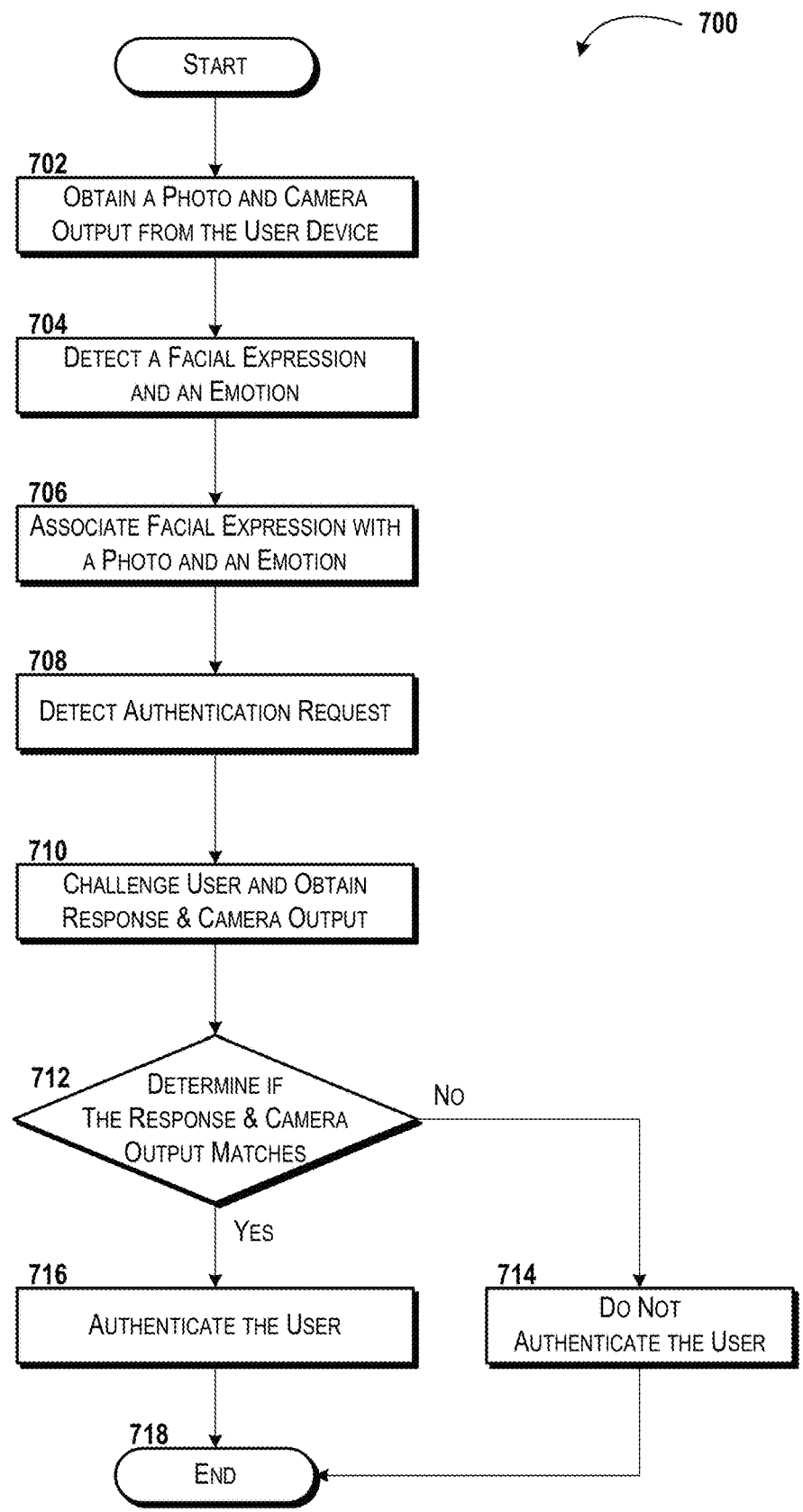
FIG. 7 is a flow diagram showing aspects of a method for providing an emotion-based authentication service, according to another illustrative embodiment of the concepts and technologies described herein.

Turning now to FIG. 7, aspects of a method 700 for providing an emotion-based authentication service 112 will be described in detail, according to an illustrative embodiment. The method 700 begins at operation 702. At operation 702, the server computer 114 can obtain a photo or other image and camera output from the user device 102. According to various embodiments of the concepts and technologies disclosed herein, the image can be uploaded by the user or other entity associated with the user device 102 as illustrated and described herein, and the camera output can be obtained substantially simultaneously, in some embodiments. Thus, the camera output can be assumed to capture a face of the user or other entity at the time the photo obtained in operation 702 is being provided and/or looked at by the user or other entity. It should be understood that this example is illustrative, and therefore should not be construed as being limiting in any way.

From operation 702, the method 700 can proceed to operation 704. At operation 704, the server computer 114 can detect a facial expression associated with the user of the user device 102. Thus, for example, the server computer 114 can analyze the camera output obtained in operation 702 and determine, for example based on a library of facial expressions that can be defined for the user or other entity, which facial expression is being expressed when the photo obtained in operation 702 is obtained with the captured camera output.

From operation 704, the method 700 can proceed to operation 706. At operation 706, the server computer 114 can generate emotion data 116. The emotion data 116 generated in operation 706 can include the photograph obtained in operation 702, an emotion (e.g., an emotion defined by the user or other entity in operation 702), and the facial expression recognized in operation 704. Thus, the emotion data 116 generated in operation 706 can associate a facial expression with an emotion, in addition to associating an emotion with an image as illustrated and described herein.

From operation 706, the method 700 can proceed to operation 708. At operation 708, the server computer 114 can detect a request to authenticate a user. In some embodiments, the server computer 114 can detect the request in operation 708 by receiving an authentication request 126 from a device or entity such as the third-party server 124 or another device, application, service, or the like. As explained above, various devices and/or entities (e.g., the third-party server 124) can be registered with the emotion-based authentication service 112 to allow emotion-based authentication of a user or device during communications between the third-party server 124 and the user or device. Thus, operation 708 can correspond to the server computer 114 receiving a request or application call to perform emotion-based authentication of a particular user or device. It should be understood that this example is illustrative, and therefore should not be construed as being limiting in any way.

From operation 708, the method 700 can proceed to operation 710. At operation 710, the server computer 114 can challenge the user (e.g., by generating and providing a challenge 128 to the user device 102) and obtain a response to the challenge 128 from the user (e.g., by obtaining the response 130 from the user device 102). According to various embodiments of the concepts and technologies disclosed herein, the challenge 128 can include the photo obtained in operation 702, and the response 130 can include an indicator of an emotion and another camera output from the user device 102. Thus, in operation 710, the server computer 114 can obtain, as the response 130, an indicator of an emotion and a new camera output that can show a facial expression of the user at the time the challenge 128 is being responded to in operation 710. It should be understood that this example is illustrative, and therefore should not be construed as being limiting in any way.

From operation 710, the method 700 can proceed to operation 712. At operation 712, the server computer 114 can determine if the response 130 (including the emotion indicated and the facial expression) obtained in operation 710 matches the expected response to the challenge 128 presented in operation 710 (e.g., the photograph and the expected facial expression associated with the expected emotion). In particular, the server computer 114 can determine if the expected response (e.g., an emotion and facial expression expected to be indicated in association with a presented image) matches the response 130 and the facial expression as obtained in operation 710. Thus, while an emotion may be guessed by an unauthorized entity, this embodiment can provide an extra layer of authentication in that a facial expression that is expected to be associated with an image and an emotion is also examined and compared to the actual facial expression of the user or other entity. It should be understood that this example is illustrative, and therefore should not be construed as being limiting in any way.

If the server computer 114 determines, in operation 712, that the response 130 obtained in operation 710 (e.g., the indicated emotion and the detected facial expression) do not match the expected response 130 (e.g., the expected emotion and the expected facial expression) to the challenge 128 provided in operation 710, the method 700 can proceed to operation 714. At operation 714, the server computer 114 can decline to authenticate the user or user device 102 for which authentication was requested in operation 708.

Thus, for example, the server computer 114 can be configured to generate and issue an authentication decision 132 that can indicate that the user or user device 102 has not been authenticated, with the authentication decision 132 being issued to one or more entities (e.g., the third-party server 124, the resource 122, or other entities). In some other embodiments, for example where the functionality of the emotion-based authentication service 112 is incorporated into other applications or services, the server computer 114 can deny access to the user device 102 if the determination is made in operation 712 that the provided response 130 and facial expression did not satisfy the expected response and facial expression to the challenge 128 (e.g., that the expected response and facial expression were not matched by the response 130 and observed facial expression). It should be understood that this example is illustrative, and therefore should not be construed as being limiting in any way.

If the server computer 114 determines, in operation 712, that the response 130 obtained in operation 710 (e.g., the indicated emotion and the detected facial expression) does match the expected response 130 (e.g., the expected emotion and the expected facial expression) to the challenge 128 provided in operation 710, the method 700 can proceed to operation 716. At operation 716, the server computer 114 can authenticate the user or user device 102 for which authentication was requested. Thus, for example, the server computer 114 can be configured to generate and issue an authentication decision 132 that can indicate that the user or user device 102 should be authenticated to one or more entities (e.g., the third-party server 124, the resource 122, or other entities). In some other embodiments, for example where the functionality of the emotion-based authentication service 112 is incorporated into other applications or services, the server computer 114 can allow access if the determination is made in operation 712 that the provided response 130 and observed facial expression match the expected response and expected facial expression. It should be understood that this example is illustrative, and therefore should not be construed as being limiting in any way.

From operation 716, the method 700 can proceed to operation 718. The method 700 also can proceed to operation 718 from operation 714. The method 700 can end at operation 718.

Figure 8:
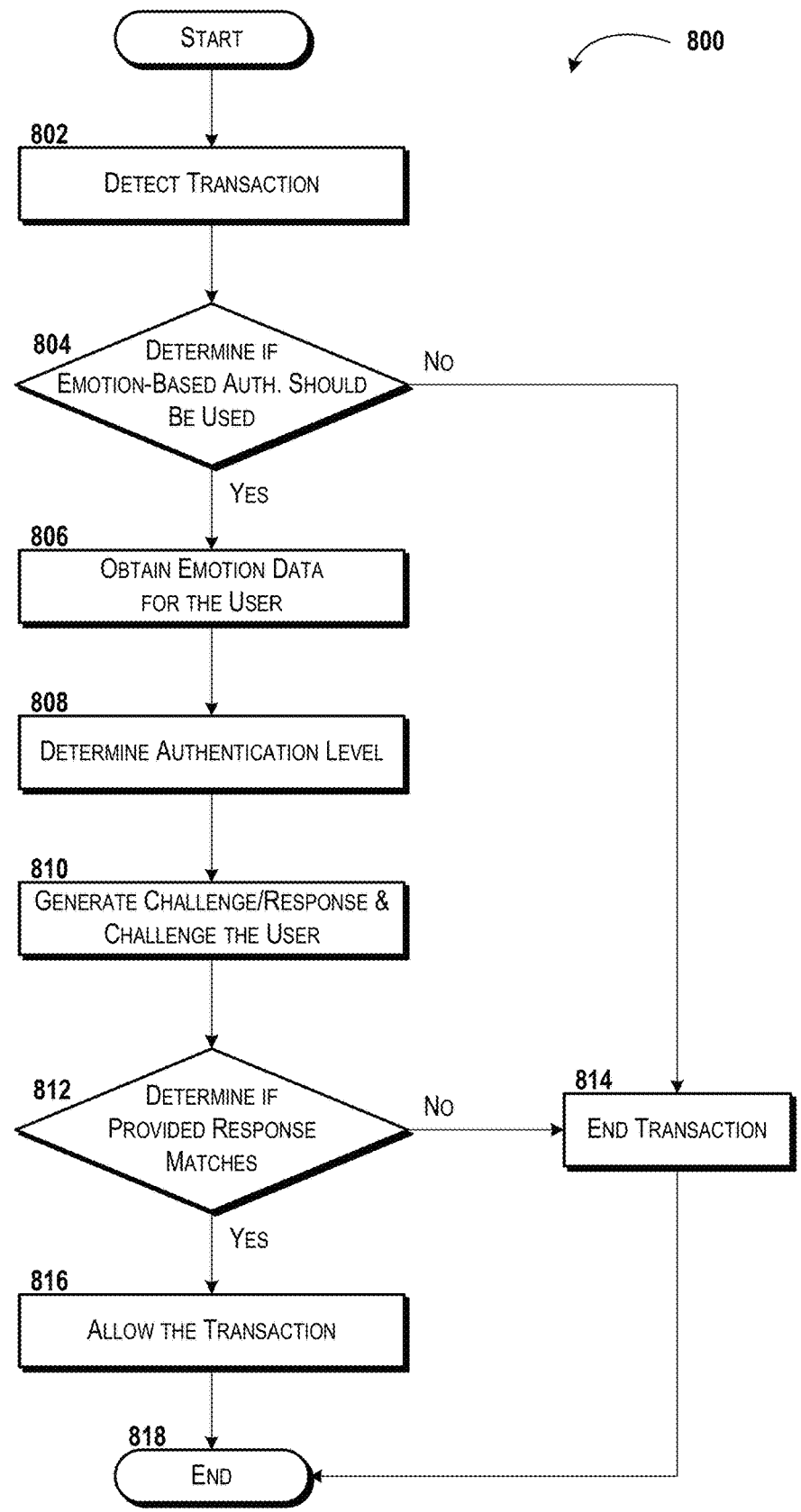
FIG. 8 is a flow diagram showing aspects of a method for authenticating a user for a transaction using an emotion-based authentication service, according to an illustrative embodiment of the concepts and technologies described herein.

Turning now to FIG. 8, aspects of a method 800 for authenticating a user for a transaction using an emotion-based authentication service 112 will be described in detail, according to an illustrative embodiment. The method 800 begins at operation 802. At operation 802, the server computer 114 can detect a transaction. In some embodiments, the transaction can occur at another device (e.g., the transaction can include an interaction, by the user device 102, with the resource 122 at the third-party server 124. In some other embodiments, for example where the functionality of the emotion-based authentication service 112 is incorporated into another application or service, the transaction detected in operation 802 can be detected at the server computer 114. Because the transaction can be detected in additional and/or alternative manners, it should be understood that these examples are illustrative, and therefore should not be construed as being limiting in any way.

From operation 802, the method 800 can proceed to operation 804. At operation 804, the server computer 114 can determine if emotion-based authentication should be used for the transaction detected in operation 802. Operation 804 can include, for example, the server computer 114 determining if the user device 102 or user or other entity associated with the user device 102 has opted in to use emotion-based authentication. Thus, for example, the server computer 114 can determine, in operation 804, if the user device 102 associated with the transaction detected in operation 802 is known by the server computer 114 and/or the emotion-based authentication service 112; if the user or other entity associated with the transaction is known by the server computer 114 and/or the emotion-based authentication service 112; or the like.

In some other embodiments, operation 804 can include the server computer 114 determining if emotion-based authentication should be used for other reasons such as, for example, whether other authentication methods are sufficient without emotion-based authentication; that a particular transaction does not require emotion-based authentication; or other considerations. Because the determination of operation 804 can be made in various manners including, but not limited to, those set forth above, it should be understood that these examples are illustrative, and therefore should not be construed as being limiting in any way.

If the server computer 114 determines, in operation 804, that the emotion—based authentication should be used, the method 800 can proceed to operation 806. At operation 806, the server computer 114 can obtain emotion data 116 for the user and/or device associated with the transaction detected in operation 802. Thus, as noted above, operation 806 can include the server computer 114 obtaining emotion data 116 associated with the user and/or user device 102 that is engaging in the transaction detected in operation 802.

From operation 806, the method 800 can proceed to operation 808. At operation 808, the server computer 114 can define an authentication level to use for the transaction detected in operation 802. According to various embodiments of the concepts and technologies disclosed herein, certain types of transactions can have an associated difficulty level specified for them by various settings and/or configurations associated with the emotion-based authentication service 112. For example, as noted above, error thresholds can be defined for certain types of transactions such as, for example, financial transactions having a low or no error threshold, and other transactions (e.g., viewing a blog post) having a high error threshold, for example.

In other embodiments, the authentication level determined in operation 808 may specify a level of definition for an emotion that can be varied from high specificity (or low generality) to low specificity (or high generality). For example, if a relatively high authentication level is specified for a particular application, a specific emotion may be required instead of a general emotion (e.g., a category). For example, in the example of the emotion "content," which may be a specific emotion falling under a more general emotion of "joyful," which itself may be a more specific emotion falling under a more general emotion of "happy," one of three authentication levels may challenge a user or other entity to state an emotion for an image or other data, where the acceptable answer (response 130) may vary along with the authentication level from "happy" (most general; lowest authentication level) to "joyful" (middle authentication level; not most general and not most specific) to "content" (most specific; highest authentication level). This example illustrates how the same image or other data can be used to challenge for an emotion of varying levels of authentication, in some embodiments. Because the concepts and technologies disclosed herein can be used to support authentication levels in additional and/or alternative manners, it should be understood that the above example is illustrative, and therefore should not be construed as being limiting in any way.

In some other embodiments, the authentication level can vary the number of photos or text blocks presented to a user or other entity; specific orders of emotions (if applicable); and/or other variables as illustrated and described herein. Thus, it should be understood that operation 808 can include determining how many images to present, how many emotions should be entered, orders that should be enforced, thresholds for error, etc. Because the authentication level can be modified in additional and/or alternative manners, it should be understood that these examples are illustrative, and therefore should not be construed as being limiting in any way.

From operation 808, the method 800 can proceed to operation 810. At operation 810, the server computer 114 can generate one or more challenge 128, an associated expected response, and provide the challenge 128 to the user and/or user device 102 to obtain a response 130. Thus, operation 810 can include the server computer 114 analyzing the emotion data 116 obtained in operation 806 to determine, based on the analyzed emotion data 116, a challenge 128 to present to the user or user device 102. For example, the challenge 128 generated in operation 810 can include data for presenting the photograph and a query for an emotion that the user or other entity has associated with that photograph where the emotion is queried from the user or user device 102 at a desired level of specificity, or other level of authentication (e.g., multiple images, groups of emotions, multiple emotions for one photo, etc.).

Operation 810 also can include the server computer 114 providing the challenge 128 to the user device 102. Thus, for example, the server computer 114 can transmit, to the user device 102, data for rendering the images and/or data for presenting the emotions. In other embodiments, the server computer 114 can present the photographs and/or emotions in a web page or other interface, so the server computer 114 may render the page and enable access to the page by the user device 102. In yet other embodiments, the server computer 114 may transmit data to the user device 102 for rendering in the appropriate format by the emotion-based authentication application 108. Because the image(s) and the emotion(s) can be provided and/or rendered in various manners, it should be understood that these examples are illustrative, and therefore should not be construed as being limiting in any way.

From operation 810, the method 800 can proceed to operation 812. At operation 812, the server computer 114 can determine if the response obtained in operation 810 matches the expected response to the challenge provided to the user device 102 in operation 810. In particular, the server computer 114 can determine if the expected response (e.g., an emotion expected to be indicated in association with a presented image, an image expected to be indicated in association with a presented emotion, an order of emotions expected to be indicated in association with a presented set of images, an order of images expected to be indicated in association with a presented set of emotions, etc.) matches the response 130 obtained in operation 810 (e.g., received from the user device 102). Thus, the server computer 114 can compare the response 130 obtained in operation 810 to the expected response to see if the response 130 obtained matches what was expected. As noted above, one or more error thresholds, orders, levels of specificity, etc. can be applied, in some embodiments, in operation 812 to determine satisfaction of the challenge 128 (or failure to satisfy the challenges 128). It should be understood that this example is illustrative, and therefore should not be construed as being limiting in any way.

If the server computer 114 determines, in operation 812, that the response obtained in operation 810 does not match the expected response to the challenge provided to the user device 102 in operation 810, the method 800 can proceed to operation 814. The method 800 also can proceed to operation 814 if the server computer 114 determines, in operation 804, that the emotion-based authentication should not be used. In operation 814, the server computer 114 can end the transaction detected in operation 802. In some embodiments, the server computer 114 can trigger termination of the transaction (e.g., by sending a command or instruction to another device to end the transaction), while in some other embodiments the server computer 114 can directly stop the transaction, if desired.

If the server computer 114 determines, in operation 812, that the response obtained in operation 810 does match the expected response to the challenge provided to the user device 102 in operation 810, the method 800 can proceed to operation 816. In operation 816, the server computer 114 can allow the transaction detected in operation 802. In some embodiments, the server computer 114 can trigger allowing the transaction to complete (e.g., by sending a command or instruction to another device to allow the transaction to complete), while in some other embodiments the server computer 114 can directly allow the transaction, if desired.

From operation 816, the method 800 can proceed to operation 818. The method 800 also can proceed to operation 818 from operation 814. The method 800 can end at operation 818.

Figure 9:
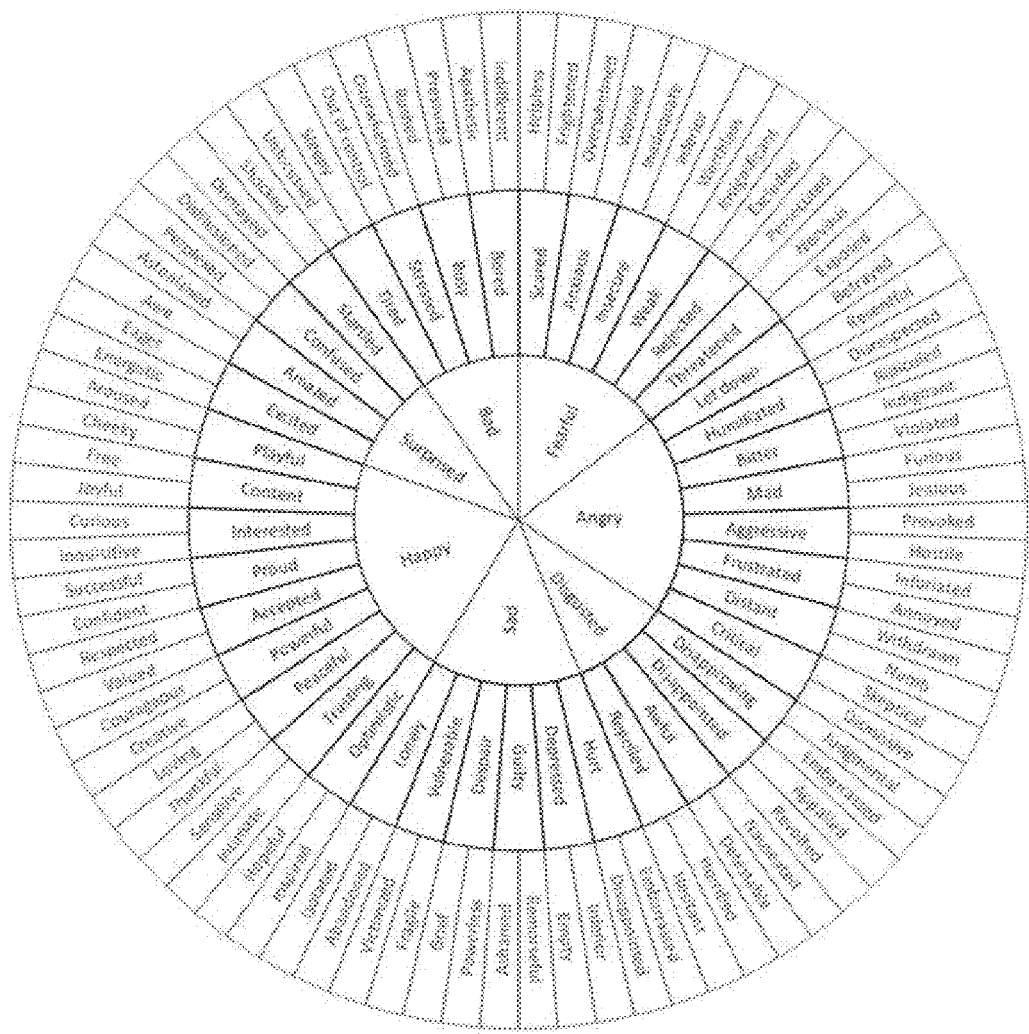
FIG. 9 illustrates an emotion wheel, according to an illustrative embodiment of the concepts and technologies described herein.

Turning now to FIG. 9, an example emotion wheel is illustrated. As can be seen with reference to FIG. 9, an emotion hierarchy can be used to guide a user to picking or specifying emotions, to assist in setting a level of specificity to enforce for various authentication levels, and/or for other reasons. The most general definition of emotion is shown in the innermost circle/ring of emotions, which includes seven general categories of emotions. The next ring of emotions corresponds to a second level of specificity of emotion as illustrated and described herein, while the outermost ring of emotions can correspond to a highest level of specificity of emotion. It should be understood that the illustrated embodiment of the emotion ring is merely illustrative of how an emotion hierarchy can be used to guide specification of an emotion and/or authentication levels. Other types of emotion hierarchies can be used in association with the concepts and technologies disclosed herein, and therefore it should be understood that this example is illustrative, and therefore should not be construed as being limiting in any way.

Figure 10A:
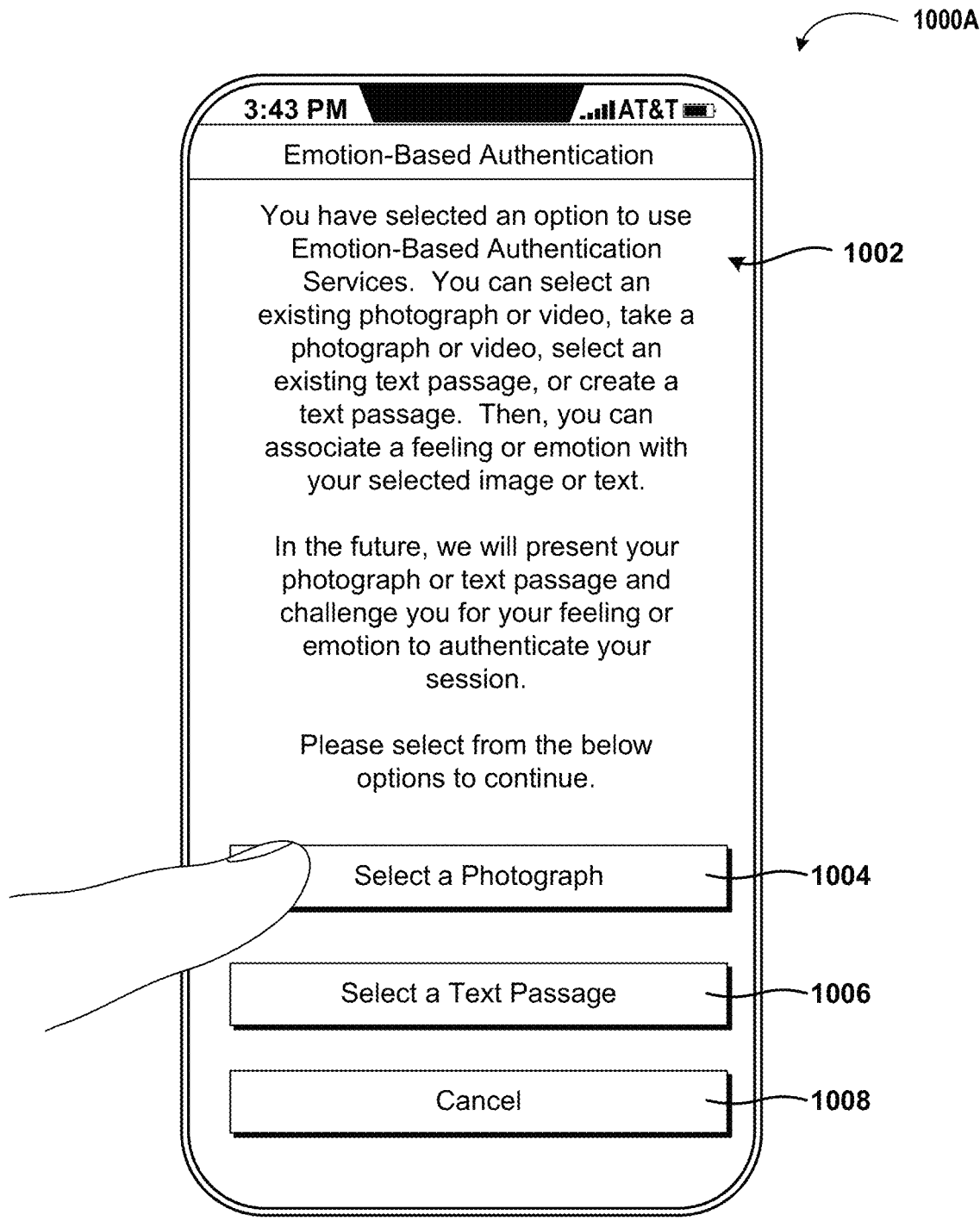
FIGS. 10A-10G are user interface diagrams showing various screen displays for providing emotion-based authentication, according to some illustrative embodiments of the concepts and technologies described herein.

FIGS. 10A-10G are user interface ("UI") diagrams showing aspects of UIs for using and/or interacting with the emotion-based authentication service 112 and/or the emotion-based authentication application 108, according to some illustrative embodiments. FIG. 10A shows an illustrative screen display 1000A. According to some embodiments of the concepts and technologies described herein, the screen display 1000A can be generated by a device such as the user device 102 via interactions with the emotion-based authentication service 112 and/or the emotion-based authentication application 108. In particular, according to various embodiments, the user device 102 can generate the screen display 1000A and/or other screen displays in conjunction with and/or based upon interactions with the emotion-based authentication application 108 described herein, which can be configured to render the screen display 1000A using data generated at the user device 102 and/or using data provided by the emotion-based authentication service 112. It should be appreciated that the UI diagram illustrated in FIG. 10A is illustrative of one contemplated example of the UIs that can be generated and/or displayed in accordance with the concepts and technologies disclosed herein, and therefore should not be construed as being limiting in any way.

According to various embodiments, the screen display 1000A can be presented, for example, when prompting a user or user device 102 for one or more photos for use by the emotion-based authentication service 112 and/or the emotion-based authentication application 108 (e.g., during a registration and/or opt-in process and/or at other times). Because the screen display 1000A illustrated in FIG. 10A can be displayed at additional and/or alternative times, it should be understood that these examples are illustrative and therefore should not be construed as being limiting in any way.

The screen display 1000A can include various menus and/or menu options (not shown in FIG. 10A). The screen display 1000A also can include a user data submission screen 1002. The user data submission screen 1002 can be configured to enable the user of the user device 102 to select a photograph (or video) from a photograph (or video) library, to take a new photograph and/or video, to select or create a text passage, or the like. In particular, the user data submission screen 1002 can include a select photograph UI option 1004. The select photograph UI option 1004 can be selected to cause the user device 102 to allow a user of the user device 102 to select a photograph or video from a photograph/video library or other image storage location; to capture a new photograph and/or video using a camera or other imaging device of the user device 102; or the like. It should be understood that this example is illustrative and therefore should not be construed as being limiting in any way.

As shown in FIG. 10A, the user data submission screen 1002 also can include a select text passage UI option 1006. The select text passage UI option 1006 can be selected to cause the user device 102 to allow a user of the user device 102 to select an existing text block or passage, to create a new text block or passage, or the like. It should be understood that this example is illustrative and therefore should not be construed as being limiting in any way.

The user data submission screen 1002 also can include a UI control 1008 to cancel the photograph and/or text selection functionality illustrated and described above. Selection of the UI control 1008 can cause the user device 102 to present additional and/or alternative UI displays and/or to exit a setup and/or opt-in to the emotion-based authentication illustrated and described herein. Thus, selection of the UI control 1008 can cause the user device 102 to dismiss the user data submission screen 1002 and/or to restart a process for submitting data as illustrated and described herein. Because additional or alternative controls can be included in the user data submission screen 1002, it should be understood that the example embodiment shown in FIG. 10A is illustrative and therefore should not be construed as being limiting in any way.

Figure 10B:
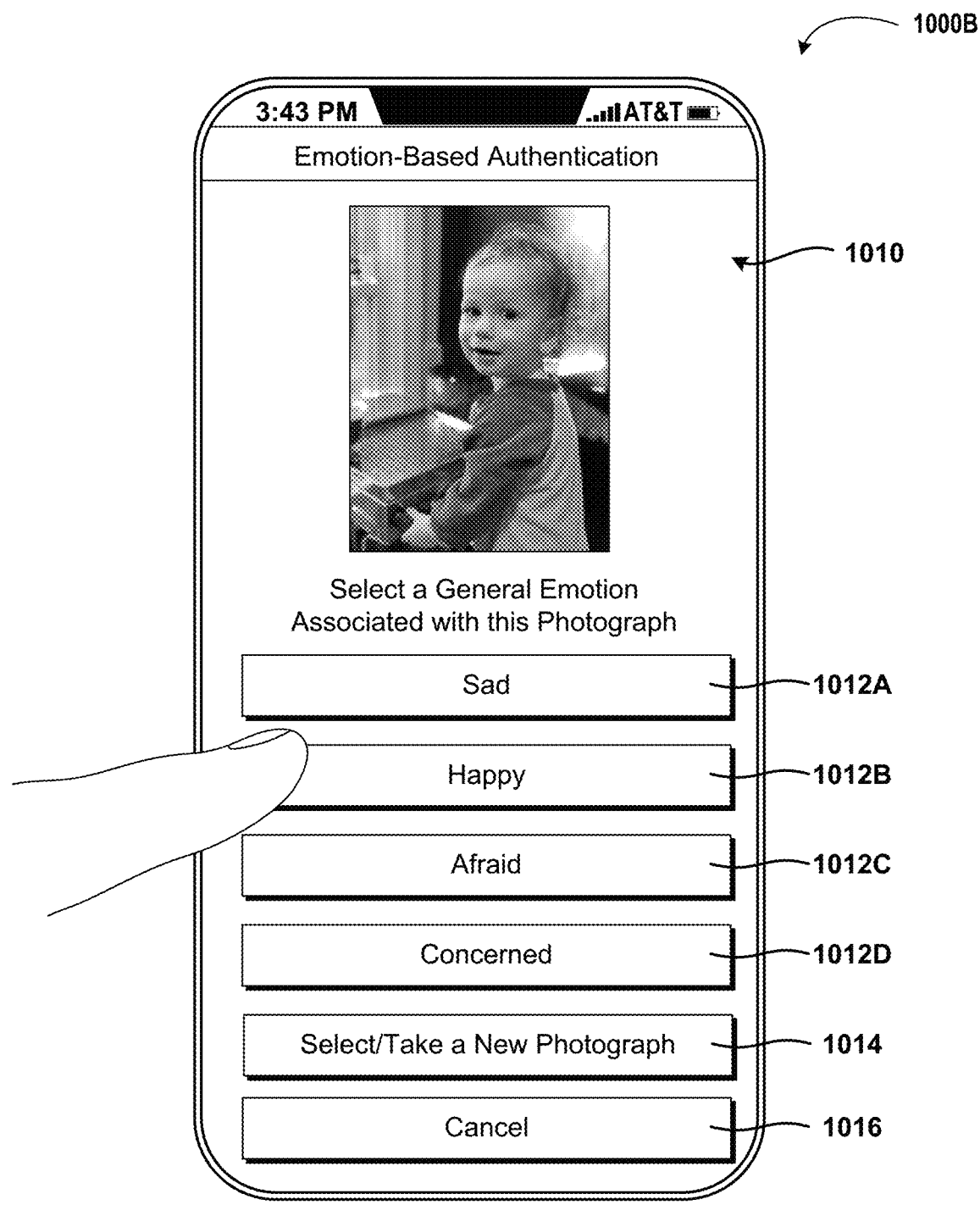

FIG. 10B shows an illustrative screen display 1000B. According to some embodiments of the concepts and technologies described herein, the screen display 1000B can be generated by a device such as the user device 102 via interactions with the emotion-based authentication service 112 and/or the emotion-based authentication application 108. In particular, according to various embodiments, the user device 102 can generate the screen display 1000B and/or other screen displays in response to a user selecting a photograph or video from a photo library as explained above with reference to FIG. 10A. Thus, it can be appreciated that FIG. 10B illustrates an example embodiment of the concepts and technologies disclosed herein for associating an emotion with an image (instead of text). It should be appreciated that the UI diagram illustrated in FIG. 10B is illustrative of one contemplated example of the UIs that can be generated and/or displayed in accordance with the concepts and technologies disclosed herein, and therefore should not be construed as being limiting in any way.

According to various embodiments, the screen display 1000B can be presented, for example, after a user has selected a photograph to use for emotion-based authentication, and can be presented to enable the user to associate an emotion with the photograph that has been selected. Because the screen display 1000B illustrated in FIG. 10B can be displayed at additional and/or alternative times, it should be understood that these examples are illustrative and therefore should not be construed as being limiting in any way.

The screen display 1000B can include various menus and/or menu options (not shown in FIG. 10B). The screen display 1000B also can include a general emotion submission screen 1010. The general emotion submission screen 1010 can be configured to enable the user of the user device 102 to associate a general emotion with a selected photograph. Thus, the general emotion submission screen 1010 can include the selected photograph (in this case a picture of a small child), and one or more general emotion selector controls 1012A-D (hereinafter collectively and/or generically referred to as "general emotion selector controls 1012"). Because more than four general emotions are included in some embodiments (e.g., see the emotion wheel illustrated in FIG. 9), it should be understood that the example embodiment shown in FIG. 10B is merely illustrative and should not be construed as being limiting in any way.

At any rate, selection of one of the general emotion selector controls 1012 can cause the user device 102 to associate the general emotion listed on the associated general emotion selector control 1012 that is selected, and to submit, to the emotion-based authentication application 108 and/or the emotion-based authentication service 112, the photograph that has been selected with an indication of the general emotion selected. It should be understood that this example is illustrative, and therefore should not be construed as being limiting in any way.

As shown in the example embodiment depicted in FIG. 10B, the user is selecting the general emotion selector control 1012B to indicate a general emotion of "happy" to associate with the selected photograph. According to various embodiments, this selection can further cause the user device 102 to present a next level of emotions that stem from the "happy" selection. It should be understood that this example is illustrative, and therefore should not be construed as being limiting in any way.

The general emotion submission screen 1010 also can include a UI control 1014 to select or take a new photograph. Selection of the UI control 1014 can cause the user device 102 to present additional and/or alternative UI displays (e.g., to again present the screen display 1000A illustrated and described with reference to FIG. 10A) and/or to exit a setup and/or opt-in to the emotion-based authentication illustrated and described herein. Thus, selection of the UI control 1014 can cause the user device 102 to dismiss the general emotion submission screen 1010, to go back one or more steps or operations in the process, and/or to restart a process for submitting data as illustrated and described herein. Similarly, the general emotion submission screen 1010 also can include a UI control 1016 to cancel the image/emotion submission process altogether. Selection of the UI control 1016 can cause the user device 102 to exit a setup and/or opt-in to the emotion-based authentication illustrated and described herein. Because additional or alternative controls can be included in the general emotion submission screen 1010, it should be understood that the example embodiment shown in FIG. 10B is illustrative and therefore should not be construed as being limiting in any way.

Figure 10C:
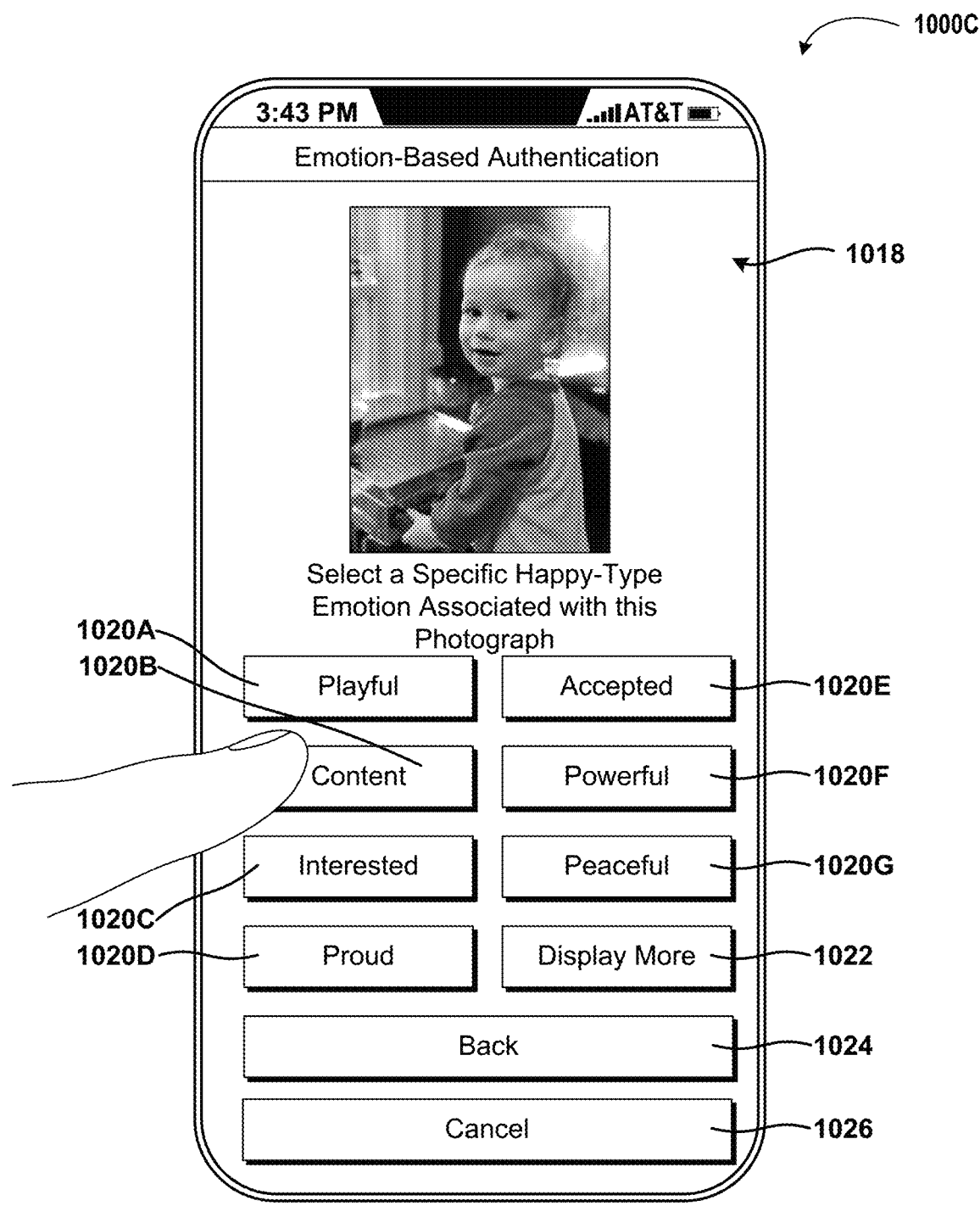

FIG. 10C shows an illustrative screen display 1000C. According to some embodiments of the concepts and technologies described herein, the screen display 1000C can be generated by a device such as the user device 102 via interactions with the emotion-based authentication service 112 and/or the emotion-based authentication application 108. In particular, according to various embodiments, the user device 102 can generate the screen display 1000C and/or other screen displays in response to a user selecting the general emotion selector control 1012B (labeled "happy") as explained above with reference to FIG. 10B. Because the screen display 1000C illustrated in FIG. 10C can be displayed at additional and/or alternative times, it should be understood that these examples are illustrative and therefore should not be construed as being limiting in any way.

The screen display 1000C can include various menus and/or menu options (not shown in FIG. 10C). The screen display 1000C also can include a second level emotion submission screen 1018. The second level emotion submission screen 1018 can be configured to enable the user of the user device 102 to associate a second level emotion with the photograph that has been selected as illustrated and described above with reference to FIGS. 10A-10B. Thus, the second level emotion submission screen 1018 can include the selected photograph (again), and one or more second level emotion selector controls 1020A-G (hereinafter collectively and/or generically referred to as "second level emotion selector controls 1020"). Because more than seven second level emotions can be defined for a particular general emotion (e.g., "happy"), it should be understood that the example embodiment shown in FIG. 10C is merely illustrative and should not be construed as being limiting in any way.

Selection of one of the second level emotion selector controls 1020 can cause the user device 102 to associate the second level emotion listed on the associated second level emotion selector control 1020 that is selected, and to submit, to the emotion-based authentication application 108 and/or the emotion-based authentication service 112, the photograph that has been selected (if not already submitted) with an indication of the second level emotion selected as being associated with the photograph. It should be understood that this example is illustrative, and therefore should not be construed as being limiting in any way.

As shown in the example embodiment depicted in FIG. 10C, the user is selecting the second level emotion selector control 1020B to indicate a second level emotion of "content" to associate with the selected photograph, where "content" can fall under the general emotion of "happy" according to various embodiments of the concepts and technologies disclosed herein. According to various embodiments, this selection can further cause the user device 102 to present a next level of emotions that stem from the "happy" and "content" selections made via the screen displays 1000B and 1000C. It should be understood that this example is illustrative, and therefore should not be construed as being limiting in any way.

The second level emotion submission screen 1018 also can include a UI control 1022 to display additional second level emotion selector controls 1020 (if additional second level emotions exist, e.g., cannot be displayed due to screen space, etc.). Thus, selection of the UI control 1022 can cause the user device 102 to present additional and/or alternative second level emotion selector controls 1020. It should be understood that this example is illustrative, and therefore should not be construed as being limiting in any way.

The second level emotion submission screen 1018 also can include a UI control 1024 to go back an operation or screen, in some embodiments. Thus, selection of the UI control 1024 can cause the user device 102 to dismiss the second level emotion submission screen 1018, to go back one or more steps or operations in the process, and/or to restart a process for submitting data as illustrated and described herein. Similarly, the second level emotion submission screen 1018 also can include a UI control 1026 to cancel the image/emotion submission process altogether. Selection of the UI control 1026 can cause the user device 102 to exit a setup and/or opt-in to the emotion-based authentication illustrated and described herein. Because additional or alternative controls can be included in the second level emotion submission screen 1018, it should be understood that the example embodiment shown in FIG. 10C is illustrative and therefore should not be construed as being limiting in any way.

Figure 10D:
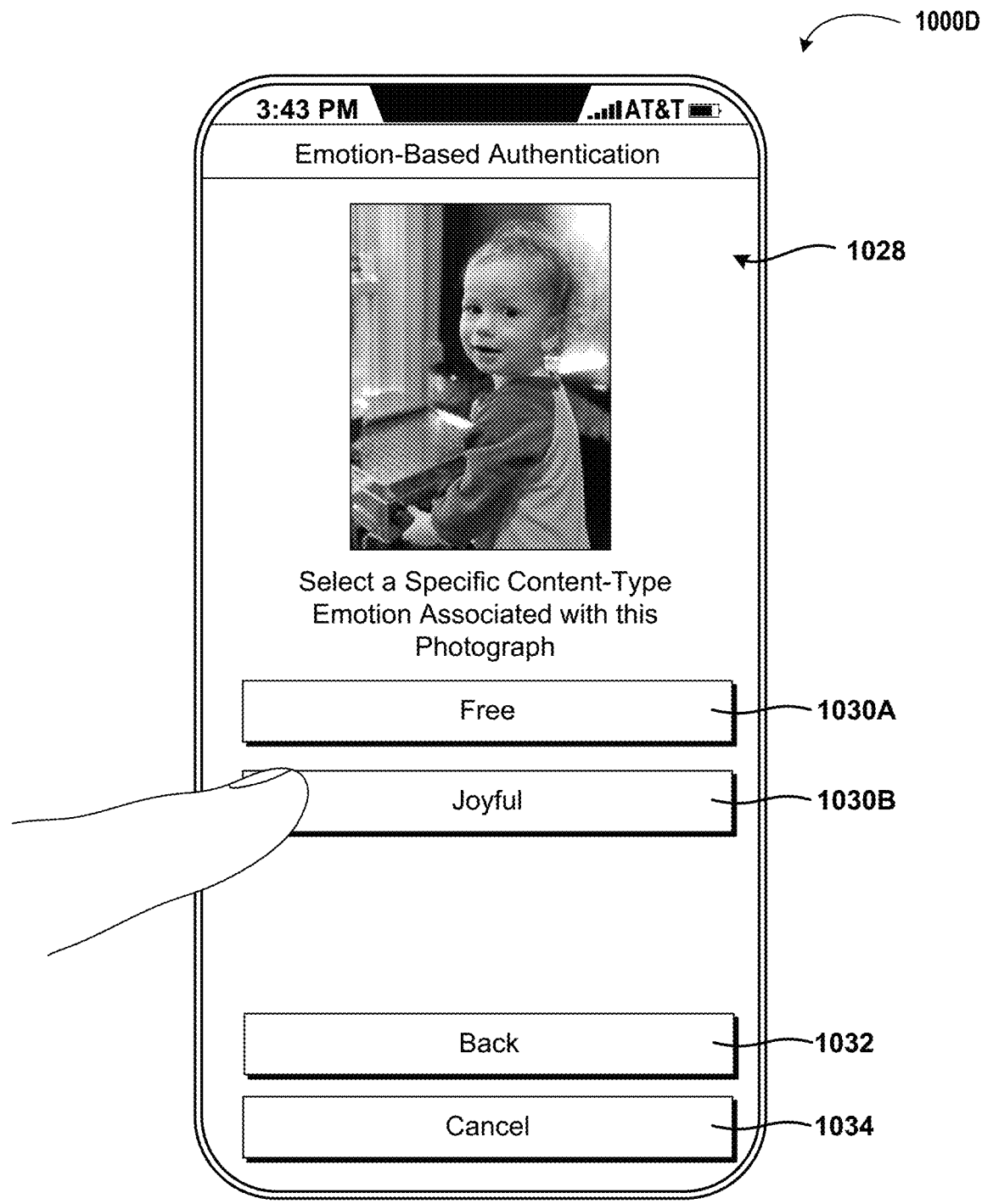

FIG. 10D shows an illustrative screen display 1000D. According to some embodiments of the concepts and technologies described herein, the screen display 1000D can be generated by a device such as the user device 102 via interactions with the emotion-based authentication service 112 and/or the emotion-based authentication application 108. In particular, according to various embodiments, the user device 102 can generate the screen display 1000D and/or other screen displays in response to a user selecting the third level emotion selector control 1020B (labeled "content") as explained above with reference to FIG. 10C. Because the screen display 1000D illustrated in FIG. 10D can be displayed at additional and/or alternative times, it should be understood that these examples are illustrative and therefore should not be construed as being limiting in any way.

The screen display 1000D can include various menus and/or menu options (not shown in FIG. 10D). The screen display 1000D also can include a third level emotion submission screen 1028. The third level emotion submission screen 1028 can be configured to enable the user of the user device 102 to associate a third level emotion with the photograph that has been selected as illustrated and described above with reference to FIGS. 10A-10C. Thus, the third level emotion submission screen 1028 can include the selected photograph (yet again), and one or more third level emotion selector controls 1030A-B (hereinafter collectively and/or generically referred to as "third level emotion selector controls 1030"). Because more than two third level emotions can be defined for a particular second level emotion (e.g., "content"), it should be understood that the example embodiment shown in FIG. 10D is merely illustrative and should not be construed as being limiting in any way.

Selection of one of the third level emotion selector controls 1030 can cause the user device 102 to associate the third level emotion listed on the associated third level emotion selector control 1030 that is selected, and to submit, to the emotion-based authentication application 108 and/or the emotion-based authentication service 112, the photograph that has been selected (if not already submitted) with an indication of the third level emotion selected as being associated with the photograph. It should be understood that this example is illustrative, and therefore should not be construed as being limiting in any way.

As shown in the example embodiment depicted in FIG. 10D, the user is selecting the third level emotion selector control 1030B to indicate a second level emotion of "joyful" to associate with the selected photograph, where "joyful" can fall under the second level emotion of "content," and wherein "content" can fall under the general emotion of "happy," according to various embodiments of the concepts and technologies disclosed herein (e.g., note FIG. 9). According to various embodiments, this selection can further cause the user device 102 to present a next level of emotions that may stem from the "happy," "content," and "joyful" selections made via the screen displays 1000B, 1000C, and 1000D, though in some other embodiments of the concepts and technologies disclosed herein, only three levels of emotions may be used. It should be understood that this example is illustrative, and therefore should not be construed as being limiting in any way.

The third level emotion submission screen 1028 also can include a UI control 1032 to go back an operation or screen, in some embodiments. Thus, selection of the UI control 1032 can cause the user device 102 to dismiss the third level emotion submission screen 1028, to go back one or more steps or operations in the process, and/or to restart a process for submitting data as illustrated and described herein. Similarly, the third level emotion submission screen 1028 also can include a UI control 1034 to cancel the image/ emotion submission process altogether. Selection of the UI control 1034 can cause the user device 102 to exit a setup and/or opt-in to the emotion-based authentication illustrated and described herein. Because additional or alternative controls can be included in the third level emotion submission screen 1028, it should be understood that the example embodiment shown in FIG. 10D is illustrative and therefore should not be construed as being limiting in any way.

Figure 10E:
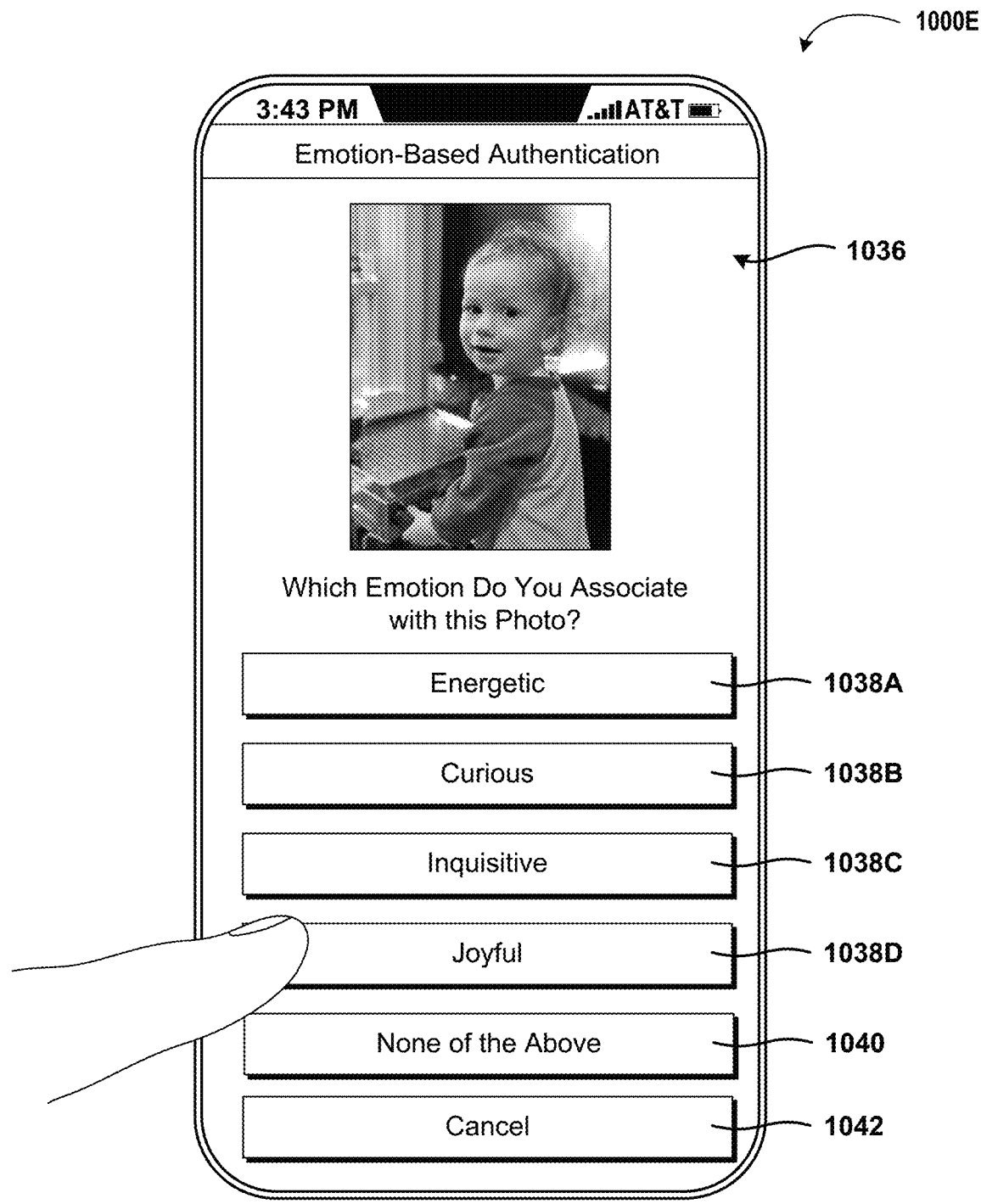

FIG. 10E shows an illustrative screen display 1000E. According to some embodiments of the concepts and technologies described herein, the screen display 1000E can be generated by a device such as the user device 102 via interactions with the emotion-based authentication service 112 and/or the emotion-based authentication application 108. In particular, according to various embodiments, the user device 102 can generate the screen display 1000E and/or other screen displays during an emotion-based authentication process as illustrated and described herein. In particular, FIG. 10E illustrates a challenge such as the challenge 128 illustrated and described herein, and functionality for the user of the user device 102 to submit a response such as the response 130. Because the screen display 1000E illustrated in FIG. 10E can be displayed at additional and/or alternative times, it should be understood that these examples are illustrative and therefore should not be construed as being limiting in any way.

The screen display 1000E can include various menus and/or menu options (not shown in FIG. 10E). The screen display 1000E also can include a challenge and response screen 1036. The challenge and response screen 1036 can be configured to enable the user of the user device 102 to be presented with a challenge 128 (e.g., a photograph, text block, video, or other information the user should be familiar with and one or more emotions that may be associated with the information). The challenge and response screen 1036 also can be configured to enable the user of the user device 102 to submit a response 130 (e.g., an emotion associated with the challenge 128) to the challenge 128. In the illustrated embodiment, the user is being challenged with a photograph that the user previously has uploaded with an associated emotion (e.g., via the process illustrated and described with reference to FIGS. 10A-10D). Thus, the challenge and response screen 1036 can include the previously uploaded photograph and one or more emotion selector controls 1038A-D (hereinafter collectively and/or generically referred to as "emotion selector controls 1038"). Because more than four emotions may be listed according to various embodiments of the concepts and technologies disclosed herein, it should be understood that the example embodiment shown in FIG. 10E is merely illustrative and should not be construed as being limiting in any way.

Selection of one of the emotion selector controls 1038 can cause the user device 102 to submit the emotion listed on the selected emotion selector control 1038 to the emotion-based authentication application 108 and/or the emotion-based authentication service 112. The emotion-based authentication application 108 and/or the emotion-based authentication service 112 can determine if the indicated emotion matches the emotion previously associated with the photograph displayed in the challenge and response screen 1036 to authenticate the user. It should be understood that this example is illustrative, and therefore should not be construed as being limiting in any way.

As shown in the example embodiment depicted in FIG. 10E, the user is selecting the emotion selector control 1038D to indicate the emotion of "joyful" as being associated with the displayed photograph. Thus, if the user previously indicated "joyful" as the emotion associated with the displayed photograph, the emotion-based authentication application 108 and/or the emotion-based authentication service 112 can determine that the user is to be authenticated. It should be understood that this example is illustrative, and therefore should not be construed as being limiting in any way.

The challenge and response screen 1036 also can include a UI control 1040 to indicate that none of the displayed emotions matches the previously indicated emotion for the photograph, in some embodiments. Thus, selection of the UI control 1040 can cause the user device 102 to present alternative emotions, to present a different photograph, to dismiss the challenge and response screen 1036, to go back one or more steps or operations in the process, and/or to restart a process for submitting data as illustrated and described herein. Similarly, the challenge and response screen 1036 also can include a UI control 1042 to cancel the authentication process altogether. Selection of the UI control 1042 can cause the user device 102 to exit an emotion-based authentication process illustrated and described herein. Because additional or alternative controls can be included in the challenge and response screen 1036, it should be understood that the example embodiment shown in FIG. 10E is illustrative and therefore should not be construed as being limiting in any way.

Figure 10F:
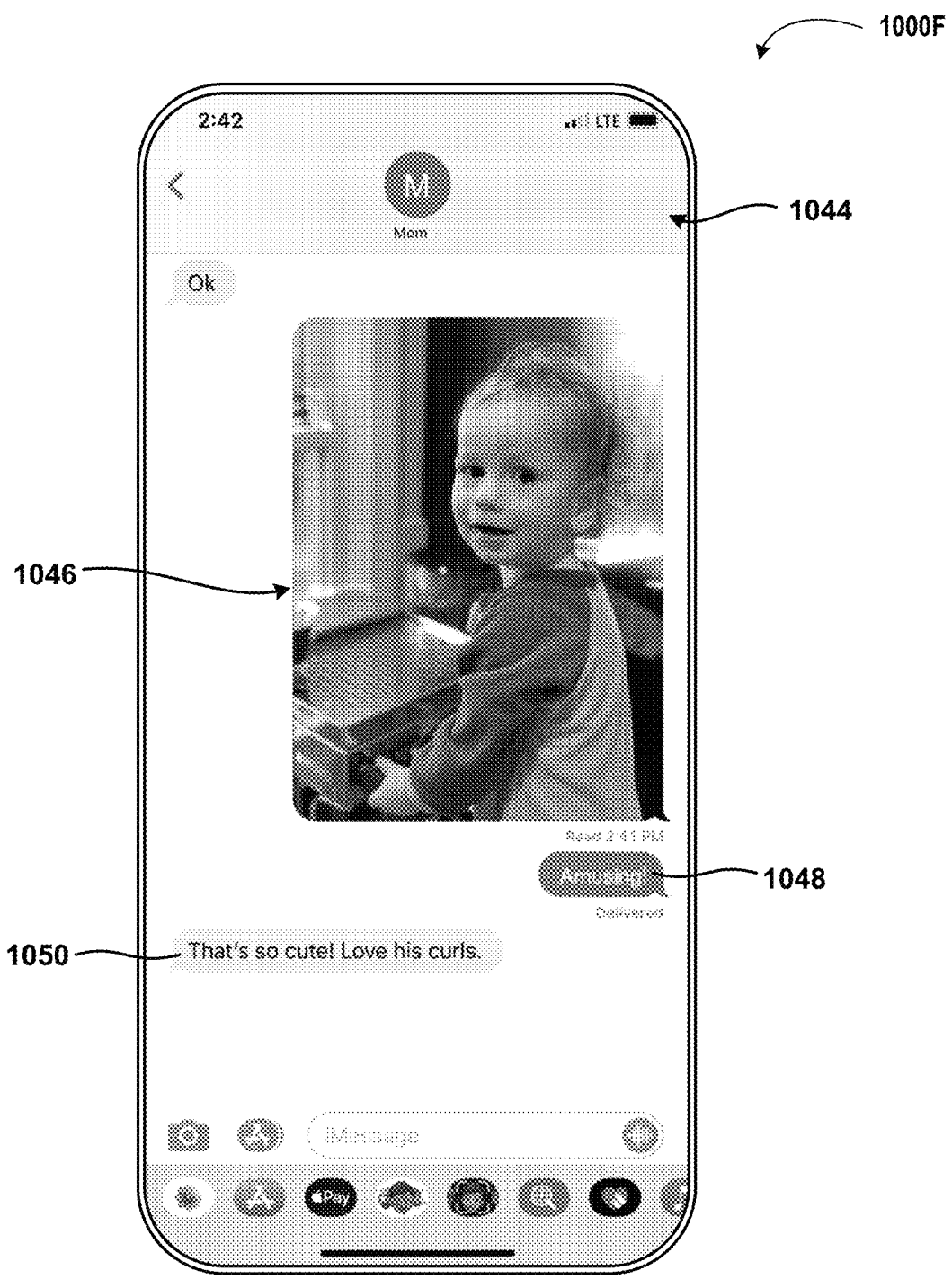

FIG. 10F shows an illustrative screen display 1000F. The screen display 1000F can include various menus and/or menu options (not shown in FIG. 10F). The screen display 1000F also can include a messaging screen 1044. The messaging screen 1044 can be used by a user of the user device 102 to message one or more other devices and/or users, as generally is known. In the illustrated embodiment, the messaging screen 1044 includes a photograph 1046 and an emotion-based message 1048. The messaging screen 1044 also can include an observational and/or emotional response message 1050 from a party with whom the user was messaging via the messaging screen 1044.

According to various embodiments of the concepts and technologies disclosed herein, the emotion-based authentication application 108 can be configured to monitor and/or interact with the messaging application that generates the messaging screen 1044 to detect photographs or text blocks and associated emotions. Thus, the emotion-based authentication application 108 can, via analysis of the messaging screen 1044, identify the phrase "amusing" as being associated with photograph 1046. More particularly, the emotion-based authentication application 108 can associate the emotion "amused" or "amusing" as being the user's emotional response to the photograph 1046 of the user who sent the photograph 1046. This association can be stored as emotion data 116 as illustrated and described herein, and can be used for an activity-based challenge and/or response as will be illustrated and described herein. It should be understood that this example is illustrative, and therefore should not be construed as being limiting in any way.

Figure 10G:
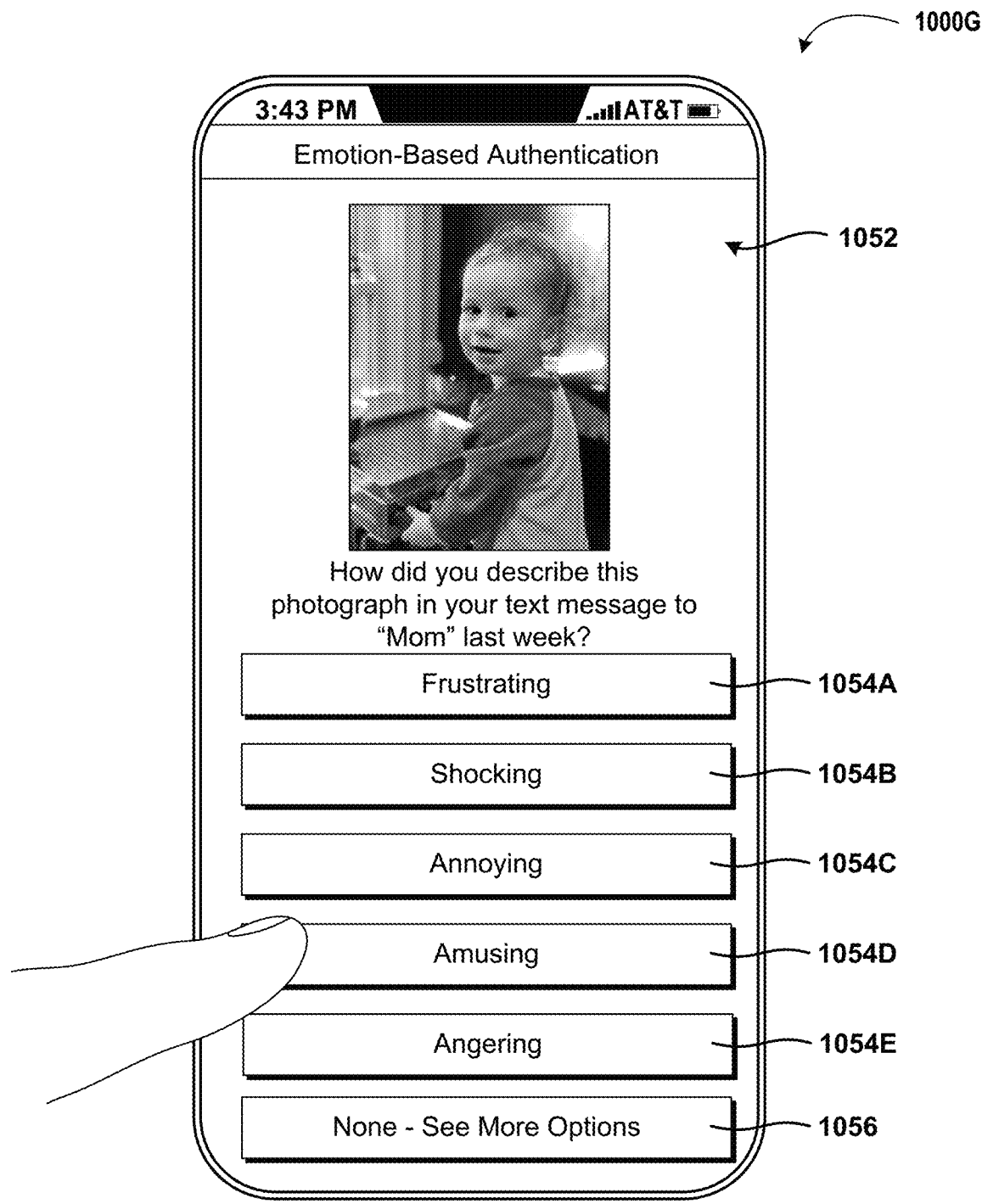

FIG. 10G shows an illustrative screen display 1000G. According to some embodiments of the concepts and technologies described herein, the screen display 1000G can be generated by a device such as the user device 102 via interactions with the emotion-based authentication service 112 and/or the emotion-based authentication application 108. In particular, according to various embodiments, the user device 102 can generate the screen display 1000G and/or other screen displays during an emotion-based authentication process as illustrated and described herein. In particular, FIG. 10G illustrates a challenge such as the challenge 128 illustrated and described herein, and functionality for the user of the user device 102 to submit a response such as the response 130. Because the screen display 1000G illustrated in FIG. 10G can be displayed at additional and/or alternative times, it should be understood that these examples are illustrative and therefore should not be construed as being limiting in any way.

The screen display 1000G can include various menus and/or menu options (not shown in FIG. 10G). The screen display 1000G also can include an activity-based challenge and response screen 1052. The activity-based challenge and response screen 1052 can be configured to enable the user of the user device 102 to be presented with a challenge 128 (e.g., a photograph, text block, video, or other information the user should be familiar with and one or more emotions that may be associated with the information). The activity-based challenge and response screen 1052 also can be configured to enable the user of the user device 102 to submit a response 130 (e.g., an emotion associated with the challenge 128) to the challenge 128.

In the illustrated embodiment, the user is being challenged with a photograph that the user previously has interacted with and indicated an emotion for on the user device 102 or other devices or applications (e.g., the data sources 120 illustrated and described herein). For example, the user may have messaged someone (e.g., his or her mother) with the photograph and either the user or the mother may have indicated an emotion associated with the photograph as shown in the example embodiment shown in FIG. 10F. It should be understood that this example is illustrative, and therefore should not be construed as being limiting in any way.

Thus, the activity-based challenge and response screen 1052 can include the previously interacted-with photograph and one or more activity-based emotion selector controls 1054A-E (hereinafter collectively and/or generically referred to as "activity-based emotion selector controls 1054"). Because more than five emotions may be listed according to various embodiments of the concepts and technologies disclosed herein, it should be understood that the example embodiment shown in FIG. 10G is merely illustrative and should not be construed as being limiting in any way.

Selection of one of the activity-based emotion selector controls 1054 can cause the user device 102 to submit the emotion listed on the selected activity-based emotion selector control 1054 to the emotion-based authentication application 108 and/or the emotion-based authentication service 112 for authentication (e.g., to see if the emotion indicated by the user now matches the emotion previously matched with the photograph in the activity used to generate the challenge and response). In particular, the emotion-based authentication application 108 and/or the emotion-based authentication service 112 can determine if the indicated emotion matches the emotion previously associated with the photograph displayed in the activity-based challenge and response screen 1052 to authenticate the user. It should be understood that this example is illustrative, and therefore should not be construed as being limiting in any way.

As shown in the example embodiment depicted in FIG. 10G, the user is selecting the activity-based emotion selector control 1054D to indicate the emotion of "amusing" as being associated with the displayed photograph. Thus, if the user previously indicated "amusing" as the emotion associated with the displayed photograph, the emotion-based authentication application 108 and/or the emotion-based authentication service 112 can determine that the user is to be authenticated. It should be understood that this example is illustrative, and therefore should not be construed as being limiting in any way.

The activity-based challenge and response screen 1052 also can include a UI control 1056 to indicate that none of the displayed emotions matches the previously indicated emotion for the photograph, in some embodiments. Thus, selection of the UI control 1056 can cause the user device 102 to present alternative emotions, to present a different photograph, to dismiss the activity-based challenge and response screen 1052, to go back one or more steps or operations in the process, and/or to restart a process for submitting data as illustrated and described herein. Because additional or alternative controls can be included in the activity-based challenge and response screen 1052, it should be understood that the example embodiment shown in FIG. 10G is illustrative and therefore should not be construed as being limiting in any way.

Figure 11:
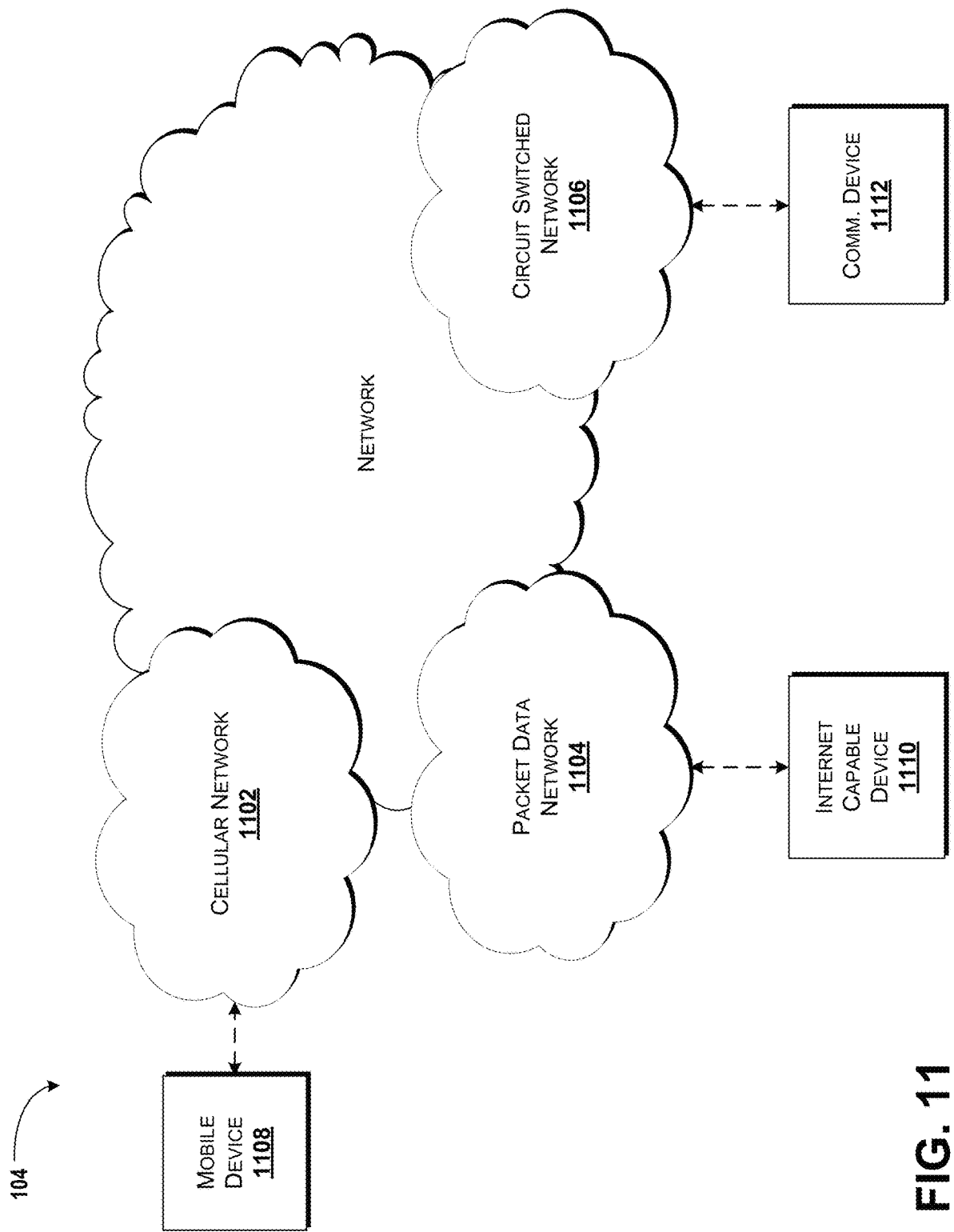
FIG. 11 schematically illustrates a network, according to an illustrative embodiment of the concepts and technologies described herein.

Turning now to FIG. 11, additional details of the network 104 are illustrated, according to an illustrative embodiment. The network 104 includes a cellular network 1102, a packet data network 1104, for example, the Internet, and a circuit switched network 1106, for example, a publicly switched telephone network ("PSTN"). The cellular network 1102 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1102 also includes radios and nodes for receiving and transmitting voice, data, and combinations thereof to and from radio transceivers, networks, the packet data network 1104, and the circuit switched network 1106.

A mobile communications device 1108, such as, for example, a cellular telephone, a user equipment, a mobile terminal, a PDA, a laptop computer, a handheld computer, and combinations thereof, can be operatively connected to the cellular network 1102. The cellular network 1102 can be configured as a 2G GSM network and can provide data communications via GPRS and/or EDGE. Additionally, or alternatively, the cellular network 1102 can be configured as a 3G UMTS network and can provide data communications via the HSPA protocol family, for example, HSDPA, EUL (also referred to as HSDPA), and HSPA+. The cellular network 1102 also is compatible with 4G mobile communications standards, 5G mobile communications standards, other mobile communications standards, and evolved and future mobile communications standards.

The packet data network 1104 includes various devices, for example, servers, computers, databases, and other devices in communication with one another, as is generally known. The packet data network 1104 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1104 includes or is in communication with the Internet. The circuit switched network 1106 includes various hardware and software for providing circuit switched communications. The circuit switched network 1106 may include, or may be, what is often referred to as a plain old telephone system (POTS). The functionality of a circuit switched network 1106 or other circuit-switched network are generally known and will not be described herein in detail.

The illustrated cellular network 1102 is shown in communication with the packet data network 1104 and a circuit switched network 1106, though it should be appreciated that this is not necessarily the case. One or more Internet-capable devices 1110, for example, a PC, a laptop, a portable device, or another suitable device, can communicate with one or more cellular networks 1102, and devices connected thereto, through the packet data network 1104. It also should be appreciated that the Internet-capable device 1110 can communicate with the packet data network 1104 through the circuit switched network 1106, the cellular network 1102, and/or via other networks (not illustrated).

As illustrated, a communications device 1112, for example, a telephone, facsimile machine, modem, computer, or the like, can be in communication with the circuit switched network 1106, and therethrough to the packet data network 1104 and/or the cellular network 1102. It should be appreciated that the communications device 1112 can be an Internet-capable device, and can be substantially similar to the Internet-capable device 1110. In the specification, the network 104 is used to refer broadly to any combination of the networks 1102, 1104, 1106. It should be appreciated that substantially all of the functionality described with reference to the network 104 can be performed by the cellular network 1102, the packet data network 1104, and/or the circuit switched network 1106, alone or in combination with other networks, network elements, and the like.

Figure 12:
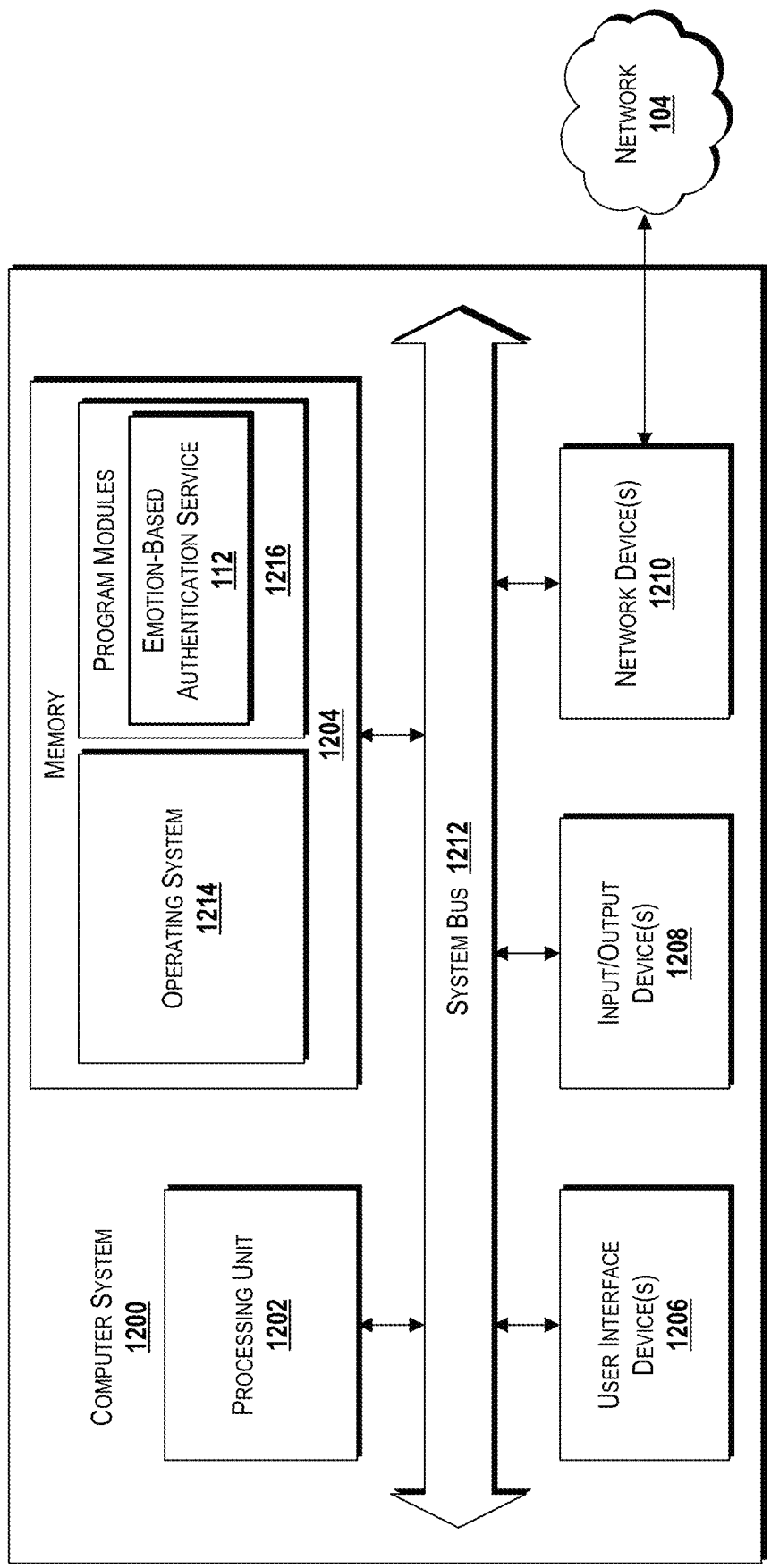
FIG. 12 is a block diagram illustrating an example computer system configured to provide an emotion-based authentication service, according to some illustrative embodiments of the concepts and technologies described herein.

FIG. 12 is a block diagram illustrating a computer system 1200 configured to provide the functionality described herein for an emotion-based authentication service, in accordance with various embodiments of the concepts and technologies disclosed herein. The computer system 1200 includes a processing unit 1202, a memory 1204, one or more user interface devices 1206, one or more input/output ("I/O") devices 1208, and one or more network devices 1210, each of which is operatively connected to a system bus 1212. The bus 1212 enables bi-directional communication between the processing unit 1202, the memory 1204, the user interface devices 1206, the I/O devices 1208, and the network devices 1210.

The processing unit 1202 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 1204 communicates with the processing unit 1202 via the system bus 1212. In some embodiments, the memory 1204 is operatively connected to a memory controller (not shown) that enables communication with the processing unit 1202 via the system bus 1212. The memory 1204 includes an operating system 1214 and one or more program modules 1216. The operating system 1214 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 1216 may include various software and/or program modules described herein. In some embodiments, for example, the program modules 1216 include the emotion-based authentication application 108, the emotion-based authentication service 112, the data sources 120, the resource 122, and/or other applications or services. These and/or other programs can be embodied in computer-readable media containing instructions that, when executed by the processing unit 1202, can perform one or more of the methods 200, 300, 400, 500, 600, 700, and/or 800 described in detail above with respect to FIGS. 2-8 and/or other functionality as illustrated and described herein. It can be appreciated that, at least by virtue of the instructions embodying the methods 200, 300, 400, 500, 600, 700, and/or 800, and/or other functionality illustrated and described herein being stored in the memory 1204 and/or accessed and/or executed by the processing unit 1202, the computer system 1200 is a special-purpose computing system that can facilitate providing the functionality illustrated and described herein. According to embodiments, the program modules 1216 may be embodied in hardware, software, firmware, or any combination thereof. Although not shown in FIG. 12, it should be understood that the memory 1204 also can be configured to store the user data 110, the emotion data 116, the other data 118, the resource 122, the authentication request 126, the challenge 128, the response 130, the authentication decision 132, and/or other data, if desired.

By way of example, and not limitation, computer-readable media may include any available computer storage media or communication media that can be accessed by the computer system 1200. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1200. In the claims, the phrase "computer storage medium" and variations thereof does not include waves or signals per se and/or communication media.

The user interface devices 1206 may include one or more devices with which a user accesses the computer system 1200. The user interface devices 1206 may include, but are not limited to, computers, servers, personal digital assistants, cellular phones, or any suitable computing devices. The I/O devices 1208 enable a user to interface with the program modules 1216. In one embodiment, the I/O devices 1208 are operatively connected to an I/O controller (not shown) that enables communication with the processing unit 1202 via the system bus 1212. The I/O devices 1208 may include one or more input devices, such as, but not limited to, a keyboard, a mouse, or an electronic stylus. Further, the I/O devices 1208 may include one or more output devices, such as, but not limited to, a display screen or a printer.

The network devices 1210 enable the computer system 1200 to communicate with other networks or remote systems via a network, such as the network 104. Examples of the network devices 1210 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 13:
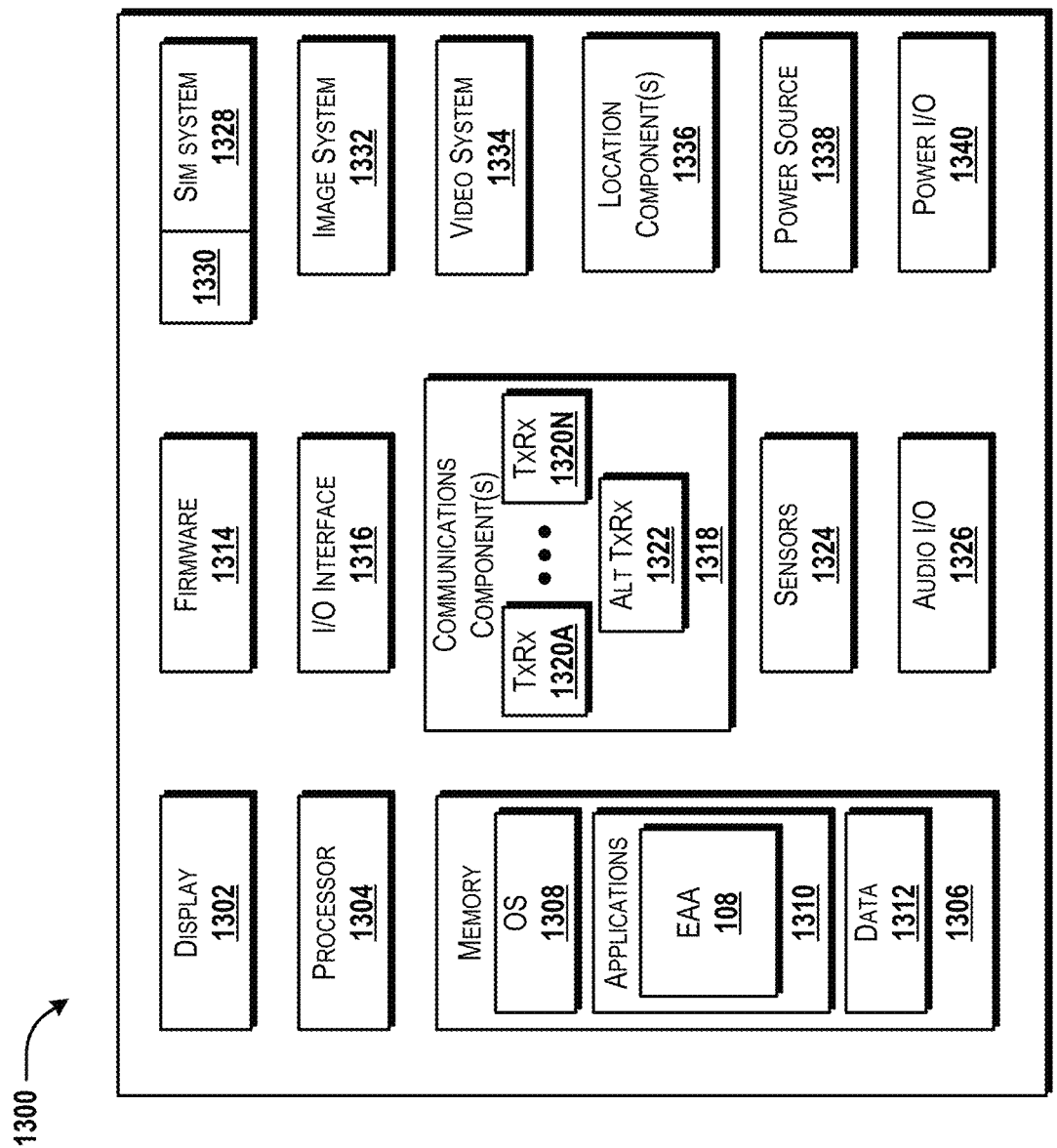
FIG. 13 is a block diagram illustrating an example mobile device configured to provide emotion-based authentication, according to some illustrative embodiments of the concepts and technologies described herein.

Turning now to FIG. 13, an illustrative mobile device 1300 and components thereof will be described. In some embodiments, the user device 102 described above with reference to FIG. 1 can be configured as and/or can have an architecture similar or identical to the mobile device 1300 described herein in FIG. 13. It should be understood, however, that the user device 102 may or may not include the functionality described herein with reference to FIG. 13. While connections are not shown between the various components illustrated in FIG. 13, it should be understood that some, none, or all of the components illustrated in FIG. 13 can be configured to interact with one another to carry out various device functions. In some embodiments, the components are arranged so as to communicate via one or more busses (not shown). Thus, it should be understood that FIG. 13 and the following description are intended to provide a general understanding of a suitable environment in which various aspects of embodiments can be implemented, and should not be construed as being limiting in any way.

As illustrated in FIG. 13, the mobile device 1300 can include a display 1302 for displaying data. According to various embodiments, the display 1302 can be configured to display various graphical user interface ("GUI") elements such as, for example, image capture applications, image viewing applications, emotions, messaging applications, text, images, video, virtual keypads and/or keyboards, messaging data, notification messages, metadata, internet content, device status, time, date, calendar data, device preferences, map and location data, combinations thereof, and/or the like. The mobile device 1300 also can include a processor 1304 and a memory or other data storage device ("memory") 1306. The processor 1304 can be configured to process data and/or can execute computer-executable instructions stored in the memory 1306. The computer-executable instructions executed by the processor 1304 can include, for example, an operating system 1308, one or more applications 1310 such as the emotion-based authentication application 108, other computer-executable instructions stored in a memory 1306, or the like. In some embodiments, the applications 1310 also can include a UI application (not illustrated in FIG. 13).

The UI application can interface with the operating system 1308, such as the operating system 106 shown in FIG. 1, to facilitate user interaction with functionality and/or data stored at the mobile device 1300 and/or stored elsewhere. In some embodiments, the operating system 1308 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1304 to aid a user in entering content, obtaining and/or providing photographs, obtaining and/or providing text, assigning emotions, recalling emotions, entering preferences, managing accounts, configuring settings, manipulating address book content and/or settings, multimode interaction, interacting with other applications 1310, and otherwise facilitating user interaction with the operating system 1308, the applications 1310, and/or other types or instances of data 1312 that can be stored at the mobile device 1300. The data 1312 can include, for example, the user data 110, the emotion data 116, the other data 118, challenges 128, responses 130, and/or other data, information, applications, programs, and/or modules. According to various embodiments, the data 1312 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 1310, the data 1312, and/or portions thereof can be stored in the memory 1306 and/or in a firmware 1314, and can be executed by the processor 1304.

It can be appreciated that, at least by virtue of storage of the instructions corresponding to the applications 1310 and/or other instructions embodying other functionality illustrated and described herein in the memory 1306, and/or by virtue of the instructions corresponding to the applications 1310 and/or other instructions embodying other functionality illustrated and described herein being accessed and/or executed by the processor 1304, the mobile device 1300 is a special-purpose mobile device that can facilitate providing the functionality illustrated and described herein. The firmware 1314 also can store code for execution during device power up and power down operations. It can be appreciated that the firmware 1314 can be stored in a volatile or non-volatile data storage device including, but not limited to, the memory 1306 and/or a portion thereof.

The mobile device 1300 also can include an input/output ("I/O") interface 1316. The I/O interface 1316 can be configured to support the input/output of data such as location information, user data 110, other data 118, challenges 128, responses 130, organization information, presence status information, user IDs, passwords, and application initiation (start-up) requests. In some embodiments, the I/O interface 1316 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 1300 can be configured to synchronize with another device to transfer content to and/or from the mobile device 1300. In some embodiments, the mobile device 1300 can be configured to receive updates to one or more of the applications 1310 via the I/O interface 1316, though this is not necessarily the case. In some embodiments, the I/O interface 1316 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1316 may be used for communications between the mobile device 1300 and a network device or local device.

The mobile device 1300 also can include a communications component 1318. The communications component 1318 can be configured to interface with the processor 1304 to facilitate wired and/or wireless communications with one or more networks such as the network 104 described herein. In some embodiments, other networks include networks that utilize non-cellular wireless technologies such as WI-FI or WIMAX. In some embodiments, the communications component 1318 includes a multimode communications subsystem for facilitating communications via the cellular network and one or more other networks.

The communications component 1318, in some embodiments, includes one or more transceivers. The one or more transceivers, if included, can be configured to communicate over the same and/or different wireless technology standards with respect to one another. For example, in some embodiments one or more of the transceivers of the communications component 1318 may be configured to communicate using GSM, CDMAONE, CDMA2000, LTE, and various other 2G, 2.5G, 3G, 4G, 5G, and later generation technology standards. Moreover, the communications component 1318 may facilitate communications over various channel access methods (which may or may not be used by the aforementioned standards) including, but not limited to, TDMA, FDMA, W-CDMA, OFDM, SDMA, and the like.

In addition, the communications component 1318 may facilitate data communications using GPRS, EDGE, the HSPA protocol family including HSDPA, EUL or otherwise termed HSDPA, HSPA+, and various other current and future wireless data access standards. In the illustrated embodiment, the communications component 1318 can include a first transceiver ("TxRx") 1320A that can operate in a first communications mode (e.g., GSM). The communications component 1318 also can include an $N^{th}$ transceiver ("TxRx") 1320N that can operate in a second communications mode relative to the first transceiver 1320A (e.g., UMTS). While two transceivers 1320A-N (hereinafter collectively and/or generically referred to as "transceivers 1320") are shown in FIG. 13, it should be appreciated that less than two, two, and/or more than two transceivers 1320 can be included in the communications component 1318.

The communications component 1318 also can include an alternative transceiver ("Alt TxRx") 1322 for supporting other types and/or standards of communications. According to various contemplated embodiments, the alternative transceiver 1322 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 1318 also can facilitate reception from terrestrial radio networks, digital satellite radio networks, internet-based radio service networks, combinations thereof, and the like. The communications component 1318 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1300 also can include one or more sensors 1324. The sensors 1324 can include temperature sensors, light sensors, air quality sensors, movement sensors, orientation sensors, noise sensors, proximity sensors, or the like. As such, it should be understood that the sensors 1324 can include, but are not limited to, accelerometers, magnetometers, gyroscopes, infrared sensors, noise sensors, microphones, combinations thereof, or the like. Additionally, audio capabilities for the mobile device 1300 may be provided by an audio I/O component 1326. The audio I/O component 1326 of the mobile device 1300 can include one or more speakers for the output of audio signals, one or more microphones for the collection and/or input of audio signals, and/or other audio input and/or output devices.

The illustrated mobile device 1300 also can include a subscriber identity module ("SIM") system 1328. The SIM system 1328 can include a universal SIM ("USIM"), a universal integrated circuit card ("UICC") and/or other identity devices. The SIM system 1328 can include and/or can be connected to or inserted into an interface such as a slot interface 1330. In some embodiments, the slot interface 1330 can be configured to accept insertion of other identity cards or modules for accessing various types of networks. Additionally, or alternatively, the slot interface 1330 can be configured to accept multiple subscriber identity cards. Because other devices and/or modules for identifying users and/or the mobile device 1300 are contemplated, it should be understood that these embodiments are illustrative, and should not be construed as being limiting in any way.

The mobile device 1300 also can include an image capture and processing system 1332 ("image system"). The image system 1332 can be configured to capture or otherwise obtain photos, videos, and/or other visual information. As such, the image system 1332 can include cameras, lenses, charge-coupled devices ("CCDs"), combinations thereof, or the like. The mobile device 1300 may also include a video system 1334. The video system 1334 can be configured to capture, process, record, modify, and/or store video content. Photos and videos obtained using the image system 1332 and the video system 1334, respectively, may be added as message content to an MMS message, email message, and sent to another mobile device. The video and/or photo content also can be shared with other devices via various types of data transfers via wired and/or wireless communication devices as described herein.

The mobile device 1300 also can include one or more location components 1336. The location components 1336 can be configured to send and/or receive signals to determine a geographic location of the mobile device 1300. According to various embodiments, the location components 1336 can send and/or receive signals from global positioning system ("GPS") devices, assisted-GPS ("A-GPS") devices, WI-FI/WIMAX and/or cellular network triangulation data, combinations thereof, and the like. The location component 1336 also can be configured to communicate with the communications component 1318 to retrieve triangulation data for determining a location of the mobile device 1300. In some embodiments, the location component 1336 can interface with cellular network nodes, telephone lines, satellites, location transmitters and/or beacons, wireless network transmitters and receivers, combinations thereof, and the like. In some embodiments, the location component 1336 can include and/or can communicate with one or more of the sensors 1324 such as a compass, an accelerometer, and/or a gyroscope to determine the orientation of the mobile device 1300. Using the location component 1336, the mobile device 1300 can generate and/or receive data to identify its geographic location, or to transmit data used by other devices to determine the location of the mobile device 1300. The location component 1336 may include multiple components for determining the location and/or orientation of the mobile device 1300.

The illustrated mobile device 1300 also can include a power source 1338. The power source 1338 can include one or more batteries, power supplies, power cells, and/or other power subsystems including alternating current ("AC") and/or direct current ("DC") power devices. The power source 1338 also can interface with an external power system or charging equipment via a power I/O component 1340. Because the mobile device 1300 can include additional and/or alternative components, the above embodiment should be understood as being illustrative of one possible operating environment for various embodiments of the concepts and technologies described herein. The described embodiment of the mobile device 1300 is illustrative, and should not be construed as being limiting in any way.

Figure 14:
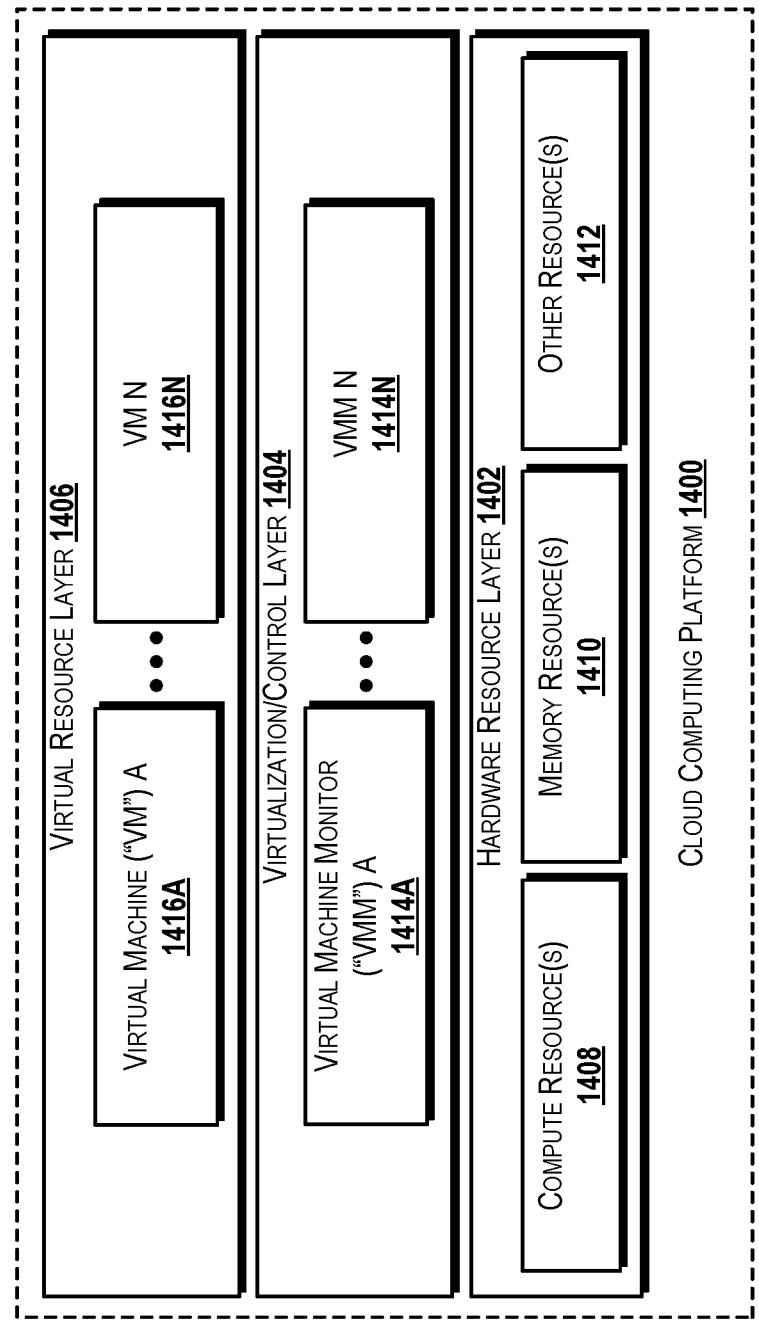
FIG. 14 is a diagram illustrating a computing environment capable of implementing aspects of the concepts and technologies disclosed herein, according to some illustrative embodiments of the concepts and technologies described herein.

FIG. 14 illustrates an illustrative architecture for a cloud computing platform 1400 that can be capable of executing the software components described herein for providing an emotion-based authentication service 112 and/or for interacting with the emotion-based authentication application 108, the emotion-based authentication service 112, the resource 122, and/or other applications, services, devices, and/or entities illustrated and described in the FIGURES. Thus, it can be appreciated that in some embodiments of the concepts and technologies disclosed herein, the cloud computing platform 1400 illustrated in FIG. 14 can be used to provide the functionality described herein with respect to the user device 102, the server computer 114, the data sources 120, and/or the third-party server 124.

The cloud computing platform 1400 thus may be utilized to execute any aspects of the software components presented herein. Thus, according to various embodiments of the concepts and technologies disclosed herein, the emotion-based authentication application 108, the emotion-based authentication service 112, the data sources 120, and/or the resource 122 can be implemented, at least in part, on or by elements included in the cloud computing platform 1400 illustrated and described herein. Those skilled in the art will appreciate that the illustrated cloud computing platform 1400 is a simplification of but only one possible implementation of an illustrative cloud computing platform, and as such, the illustrated cloud computing platform 1400 should not be construed as being limiting in any way.

In the illustrated embodiment, the cloud computing platform 1400 can include a hardware resource layer 1402, a virtualization/control layer 1404, and a virtual resource layer 1406. These layers and/or other layers can be configured to cooperate with each other and/or other elements of a cloud computing platform 1400 to perform operations as will be described in detail herein. While connections are shown between some of the components illustrated in FIG. 14, it should be understood that some, none, or all of the components illustrated in FIG. 14 can be configured to interact with one another to carry out various functions described herein. In some embodiments, the components are arranged so as to communicate via one or more networks such as, for example, the network 104 illustrated and described hereinabove (not shown in FIG. 14). Thus, it should be understood that FIG. 14 and the following description are intended to provide a general understanding of a suitable environment in which various aspects of embodiments can be implemented, and should not be construed as being limiting in any way.

The hardware resource layer 1402 can provide hardware resources. In the illustrated embodiment, the hardware resources can include one or more compute resources 1408, one or more memory resources 1410, and one or more other resources 1412. The compute resource(s) 1408 can include one or more hardware components that can perform computations to process data, and/or to execute computer-executable instructions of one or more application programs, operating systems, services, and/or other software including, but not limited to, the emotion-based authentication application 108, the emotion-based authentication service 112, the data sources 120, and/or the resource 122 illustrated and described herein.

According to various embodiments, the compute resources 1408 can include one or more central processing units ("CPUs"). The CPUs can be configured with one or more processing cores. In some embodiments, the compute resources 1408 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 1408 can include one or more discrete GPUs. In some other embodiments, the compute resources 1408 can include one or more CPU and/or GPU components that can be configured in accordance with a co-processing CPU/GPU computing model. Thus, it can be appreciated that in some embodiments of the compute resources 1408, a sequential part of an application can execute on a CPU and a computationally-intensive part of the application can be accelerated by the GPU. It should be understood that this example is illustrative, and therefore should not be construed as being limiting in any way.

In some embodiments, the compute resources 1408 also can include one or more system on a chip ("SoC") components. It should be understood that an SoC component can operate in association with one or more other components as illustrated and described herein, for example, one or more of the memory resources 1410 and/or one or more of the other resources 1412. In some embodiments in which an SoC component is included, the compute resources 1408 can be or can include one or more embodiments of the SNAPDRAGON brand family of SoCs, available from QUALCOMM of San Diego, Calif.; one or more embodiment of the TEGRA brand family of SoCs, available from NVIDIA of Santa Clara, Calif.; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Tex.; one or more customized versions of any of the above SoCs; and/or one or more other brand and/or one or more proprietary SoCs.

The compute resources 1408 can be or can include one or more hardware components arranged in accordance with an ARM architecture, available for license from ARM HOLDINGS of Cambridge, United Kingdom. Alternatively, the compute resources 1408 can be or can include one or more hardware components arranged in accordance with an x86 architecture, such as an architecture available from INTEL CORPORATION of Mountain View, Calif., and others. Those skilled in the art will appreciate the implementation of the compute resources 1408 can utilize various computation architectures and/or processing architectures. As such, the various example embodiments of the compute resources 1408 as mentioned hereinabove should not be construed as being limiting in any way. Rather, implementations of embodiments of the concepts and technologies disclosed herein can be implemented using compute resources 1408 having any of the particular computation architecture and/or combination of computation architectures mentioned herein as well as other architectures.

Although not separately illustrated in FIG. 14, it should be understood that the compute resources 1408 illustrated and described herein can host and/or execute various services, applications, portals, and/or other functionality illustrated and described herein. Thus, the compute resources 1408 can host and/or can execute the emotion-based authentication application 108, the emotion-based authentication service 112, the data sources 120, the resource 122, and/or other applications or services illustrated and described herein.

The memory resource(s) 1410 can include one or more hardware components that can perform or provide storage operations, including temporary and/or permanent storage operations. In some embodiments, the memory resource(s) 1410 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 1408, subject to the definition of "computer storage media" provided above (e.g., as excluding waves and signals per se and/or communication media as defined in this application).

Although not illustrated in FIG. 14, it should be understood that the memory resources 1410 can host or store the various data illustrated and described herein including, but not limited to, the user data 110, the emotion data 116, the other data 118, the resource 122, the authentication request 126, the challenge 128, the response 130, the authentication decision 132, and/or other data, if desired. It should be understood that this example is illustrative, and therefore should not be construed as being limiting in any way.

The other resource(s) 1412 can include any other hardware resources that can be utilized by the compute resources(s) 1408 and/or the memory resource(s) 1410 to perform operations. The other resource(s) 1412 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 1402 can be virtualized by one or more virtual machine monitors ("VMMs") 1414A-1414N (also known as "hypervisors;" hereinafter "VMMs 1414"). The VMMs 1414 can operate within the virtualization/control layer 1404 to manage one or more virtual resources that can reside in the virtual resource layer 1406. The VMMs 1414 can be or can include software, firmware, and/or hardware that alone or in combination with other software, firmware, and/or hardware, can manage one or more virtual resources operating within the virtual resource layer 1406.

The virtual resources operating within the virtual resource layer 1406 can include abstractions of at least a portion of the compute resources 1408, the memory resources 1410, the other resources 1412, or any combination thereof. These abstractions are referred to herein as virtual machines ("VMs"). In the illustrated embodiment, the virtual resource layer 1406 includes VMs 1416A-1416N (hereinafter "VMs 1416").

Based on the foregoing, it should be appreciated that systems and methods for providing an emotion-based authentication service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
   a processor; and
   a memory that stores computer-executable instructions that, when executed by the processor, cause the processor to perform operations comprising
      obtaining an image from a user device,
      identifying an emotion associated with the image, wherein the emotion is identified based on a selection of an indication of emotion obtained while presenting, at the user device, the image,
      detecting an authentication request that requests authentication of the user device for a transaction, the authentication using an emotion-based authentication service that is to be used for the transaction,
      determining, for the transaction, an authentication level,
      generating, based on the emotion, the authentication level, and the image, a challenge for the user device and an expected response to the challenge, the challenge comprising the image and a plurality of indications of emotions comprising the indication of emotion, and the expected response comprising the indication of emotion,
      receiving, from the user device, a response to the challenge, the response comprising a further selection of a one of the plurality of indications of emotions, and
      determining if the user device is to be authenticated based on the response to the challenge and the expected response to the challenge.

2. The system of claim 1, wherein the selection of the indication of emotion is obtained from the user device.

3. The system of claim 1, wherein generating the challenge comprises generating data that, when rendered by the user device, causes the user device to present the image and to challenge for the selection of the one of the plurality of indications of emotions.

4. The system of claim 1, wherein obtaining the image comprises obtaining a group of images, wherein identifying the indication of emotion comprises identifying a group of indications of emotions associated with the group of images, and wherein the challenge comprises:
   a plurality of groups of images comprising the group of images;
   a plurality of groups of emotions comprising the group of indications of emotions; and
   a further challenge to indicate, via a user interface, that the group of images matches the group of indications of emotions.

5. A method comprising:
   obtaining, at a computer comprising a processor that executes an emotion-based authentication service, an image from a user device;
   identifying, by the processor, an emotion associated with the image, wherein the emotion is identified based on a selection of an indication of emotion obtained while presenting, at the user device, the image;
   detecting, by the processor, an authentication request that requests authentication of the user device for a transaction, the authentication using the emotion-based authentication service that is to be used for the transaction;
   determining, by the processor, an authentication level for the transaction;
   generating, by the processor and based on the emotion, the authentication level, and the image, a challenge for the user device and an expected response to the challenge, the challenge comprising the image and a plurality of indications of emotions comprising the indication of emotion, and the expected response comprising the indication of emotion;
   receiving, by the processor and from the user device, a response to the challenge, the response comprising a further selection of a one of the plurality of indications of emotions; and
   determining, by the processor, if the user device is to be authenticated based on the response to the challenge and the expected response to the challenge.

6. The method of claim 5, wherein the selection of the indication of emotion is obtained from the user device.

7. The method of claim 5, further comprising:
   registering the user device with the emotion-based authentication service, wherein registering the user device comprises obtaining an opt-in from the user device for using emotion-based authentication.

8. The method of claim 5, wherein identifying the emotion comprises receiving, from the user device, data that defines the emotion at a plurality of levels of specificity comprising a general category of emotion and a specific emotion that falls in the general category of emotion.

9. The method of claim 5, wherein generating the challenge comprises generating data that, when rendered by the user device, causes the user device to present the image and to challenge for the selection of the one of the plurality of indications of emotions.

10. The method of claim 5, wherein the selection of the one of the plurality of indications of emotions is made via a user interface that is presented at the user device, the user interface comprising the image and the plurality of indications of emotions.

11. The method of claim 5, wherein obtaining the image comprises obtaining a group of images, wherein identifying the indication of emotion comprises identifying a group of indications of emotions associated with the group of images, and wherein the challenge comprises:
   a plurality of groups of images comprising the group of images;
   a plurality of groups of emotions comprising the group of indications of emotions; and
   a further challenge to indicate, via a user interface, that the group of images matches the group of indications of emotions.

12. The method of claim 5, further comprising:
   obtaining, from data sources, additional indications of the emotion; and
   generating the challenge based on the additional indications of the emotion.

13. The method of claim 12, wherein the data sources comprise a social networking platform and a messaging platform.

14. The method of claim 5, wherein obtaining the image further comprises obtaining camera output obtained from the user device, wherein the camera output is analyzed to determine a facial expression associated with the emotion, and wherein determining if the user device is to be authenticated comprises determining a further facial expression based on a further camera output and determining if the further facial expression matches the facial expression.

15. The method of claim 5, wherein generating the challenge comprises generating data that, when rendered by the user device, causes the user device to present the image in a user interface with a user interface control that identifies the indication of emotion.

16. The method of claim 5, wherein the image was included in a message sent from the user device, and wherein the emotion was specified in the message sent from the user device.

17. A computer storage medium having computer-executable instructions stored thereon that, when executed by a processor, cause the processor to perform operations comprising:
   obtaining an image from a user device;
   identifying an emotion associated with the image, wherein the emotion is identified based on a selection of an indication of emotion obtained while presenting, at the user device, the image;
   detecting an authentication request that requests authentication of the user device for a transaction, the authentication using an emotion-based authentication service that is to be used for the transaction;
   determining, for the transaction, an authentication level;
   generating, based on the emotion, the authentication level, and the image, a challenge for the user device and an expected response to the challenge, the challenge comprising the image and a plurality of indications of emotions comprising the indication of emotion, and the expected response comprising the indication of emotion;
   receiving, from the user device, a response to the challenge, the response comprising a further selection of a one of the plurality of indications of emotions; and
   determining if the user device is to be authenticated based on the response to the challenge and the expected response to the challenge.

18. The computer storage medium of claim 17, wherein the selection of the indication of emotion is obtained from the user device.

19. The computer storage medium of claim 17, wherein generating the challenge comprises generating data that, when rendered by the user device, causes the user device to present the image and to challenge for the selection of the one of the plurality of indications of emotions.

20. The computer storage medium of claim 17, wherein obtaining the image comprises obtaining a group of images, wherein identifying the indication of emotion comprises identifying a group of indications of emotions associated with the group of images, and wherein the challenge comprises:
- a plurality of groups of images comprising the group of images;
- a plurality of groups of emotions comprising the group of indications of emotions; and
- a further challenge to indicate, via a user interface, that the group of images matches the group of indications of emotions.

* * * * *